United States Patent
Gane et al.

(10) Patent No.: US 7,470,739 B2
(45) Date of Patent: Dec. 30, 2008

(54) AQUEOUS SUSPENSIONS OF GROUND MINERAL MATERIALS, WITH LOW ION LOAD AND THEIR USES

(75) Inventors: Patrick A. C. Gane, Rothrist (CH); Matthias Buri, Rothrist (CH); Beat Karth, Oberoenz (CH)

(73) Assignee: Omya Development AG, Oftringen (CH)

( * ) Notice: Subject to any disclaimer, the term of this patent is extended or adjusted under 35 U.S.C. 154(b) by 282 days.

(21) Appl. No.: 10/532,261

(22) PCT Filed: Nov. 6, 2003

(86) PCT No.: PCT/IB03/05063

§ 371 (c)(1),
(2), (4) Date: Apr. 21, 2005

(87) PCT Pub. No.: WO2004/041882

PCT Pub. Date: May 21, 2004

(65) Prior Publication Data

US 2006/0009560 A1    Jan. 12, 2006

(30) Foreign Application Priority Data

Nov. 8, 2002    (FR) .................................. 02 14001

(51) Int. Cl.
 C08K 3/26    (2006.01)
 C08K 3/34    (2006.01)
(52) U.S. Cl. ..................................... 524/425; 524/445
(58) Field of Classification Search ................. 524/425, 524/445
 See application file for complete search history.

(56) References Cited

U.S. PATENT DOCUMENTS 6,666,953 B1    12/2003    Gane et al.

FOREIGN PATENT DOCUMENTS

FR    2 766 107 A    1/1999
FR    2 810 261 A    12/2001

OTHER PUBLICATIONS

U.S. Appl. No. 10/532,475, filed Feb. 27, 2006.
U.S. Appl. No. 10/547,641, filed Aug. 31, 2005.
U.S. Appl. No. 11/597,703, filed Dec. 11, 2006.
U.S. Appl. No. 11/895,993, filed Aug. 28, 2007.
U.S. Appl. No. 11/629,580, filed Jan. 3, 2007.

*Primary Examiner*—Robert D. Harlan
(74) *Attorney, Agent, or Firm*—Amster, Rothstein & Ebenstein LLP

(57) ABSTRACT

The invention relates to the use of a weakly ionic and water-soluble copolymer as a grinding aid agent for grinding mineral matter in aqueous suspension in order to obtain aqueous suspensions of refined mineral matter, with a dry matter concentration that can be high, with a low Brookfield™ viscosity that remains stable over time, having the property that it presents a pigmentary surface area the ionic charge of which, as determined by ionic titration, is low.

The invention relates to the aqueous suspensions of mineral matter obtained and their use in the fields of paper, paint and plastics.

50 Claims, No Drawings

AQUEOUS SUSPENSIONS OF GROUND MINERAL MATERIALS, WITH LOW ION LOAD AND THEIR USES

This application is a U.S. National Phase of PCT Application No. PCT/IB2003/005063, filed Nov. 6, 2003, and claims priority to French Application No. 02/14001, filed Nov. 8, 2002.

The present invention relates to the technical sector of suspensions of mineral matter and their applications in the fields of paper, paint and plastics, and more particularly their applications in the paper industry with a view to improving either the paper sheet manufacturing process, or the sheet treatment process, or the sheet properties.

The invention firstly concerns aqueous suspensions or "slurries" of refined mineral matter, with a dry matter concentration that can be high, that are weakly ionic and have a low Brookfield™ viscosity that remains stable over time, that is to say it relates to aqueous suspensions of refined mineral matter, with a dry matter concentration that can be high, with a low Brookfield™ viscosity that remains stable over time and having a pigmentary surface area the ionic charge of which, as determined by ionic titration, is low.

These aqueous suspensions are intended for pigmentary applications in the field of paper, paint and plastics and are used more particularly for paper applications such as paper coating and/or surface treatment of the paper, or such as the filler during the manufacture of the paper, board, or analogous sheets.

This use as filler can be direct as composition of filler during manufacture of the paper, board, or analogous sheets, or indirect as recycling composition of coating brokes when the recycling compositions of coating brokes are used in the manufacture of the paper, board, or analogous sheets.

The invention also relates to the use of a weakly ionic and water-soluble copolymer as a grinding aid agent for grinding mineral matter in aqueous suspension in order to obtain aqueous suspensions or "slurries" of said refined matter, with a dry matter concentration that can be high, with a low Brookfield™ viscosity that remains stable over time, and having the property that it presents a pigmentary surface area the ionic charge of which, as determined by ionic titration, is low.

The invention also relates to the use of same copolymer as dispersion agent of the filter cake obtained during an intermediate stage in the manufacture of refined mineral matter suspensions, with a dry matter concentration that can be high, with low Brookfield™ viscosity that remains stable over time and having a pigmentary surface area the ionic charge of which, as determined by ionic titration, is low, this intermediate stage taking place after grinding and before thermal reconcentration.

The invention also relates to said grinding aid agent by means of which it is possible to obtain aqueous suspensions of said refined mineral matter, with a dry matter concentration that can be high, with low Brookfield™ viscosity that remains stable over time and having a pigmentary surface area the ionic charge of which, as determined by ionic titration, is low.

The present invention moreover relates to the grinding process that implements said grinding aid agent.

Moreover, the invention relates to the use of said aqueous suspensions of mineral matter before or after drying or re-dispersion after drying in the field of paper or paint, and after drying in the field of plastics, and more particularly in the field of paper for paper industry applications such as, in particular, paper coating and/or the surface treatment of paper, or such as the filler, whether the latter implements a direct composition of filler or a recycling composition of coating brokes.

It also relates to the use of said aqueous suspensions of mineral matter in a drying process after grinding.

Finally, it relates to paper, board or analogous products manufactured and/or coated according to the invention.

In the manufacturing process of a sheet of paper, board or analogous product, the skilled man in the art increasingly tends to replace part of the expensive cellulose fibres by cheaper mineral matter in order to reduce the cost of the paper while improving its properties.

This mineral matter, familiar to the skilled man in the art, comprises, for example, calcium carbonate and miscellaneous analogous fillers such as dolomite, gypsum, calcium hydroxide, satin white, titanium dioxide or mixed carbonate based fillers of various metals such as, in particular, calcium associated with magnesium and analogues, various matter such as talc or analogues, and mixtures of these fillers, such as, for example talc-calcium carbonate or calcium carbonate-kaolin mixtures, or mixtures of natural calcium carbonate with aluminium hydroxide, mica or with synthetic or natural fibres or co-structures of minerals such as talc-calcium carbonate or talc-titanium dioxide co-structures.

For a long time now it has been quite common to use, as grinding aid agents, water-soluble polymers based on polyacrylic acid or its derivatives (FR 2 488 814, FR 2 603 042, EP 0 100 947, EP 0 100 948, EP 0 129 329, EP 0 542 643, EP 0 542 644) to provide aqueous mineral suspensions that meet the above-mentioned refinement and viscosity criteria, but these grinding aid agents are polymers and/or copolymers of the anionic type which have the disadvantage of requiring the addition of cationic compounds during the paper sheet manufacturing process when the aqueous mineral suspensions containing them are implemented in these sheet manufacturing operations.

The end user therefore strives to minimise the polymer agent demand during paper manufacture, for every median diameter and/or for every point of the grain size curve of the particles of mineral matter implemented.

To solve the problem, the skilled man in the art is currently familiar with the solution recommended in patent application FR 2 810 261, which has the disadvantage of not fully meeting the end user's needs because although this solution makes it possible to obtain aqueous suspensions of mineral matter with low ionic charge, it does not make it possible to have suspensions with a sufficiently low ionic charge to correspond to the end user's needs.

Moreover, the paper manufacturer who is the end user is faced with the problem of implementing coating colours which are not sufficiently stable during paper coating operations.

The skilled man in the art, being familiar with this problem, also seeks to develop aqueous suspensions of mineral matter which make it possible to obtain coating colours which are highly stable even at low anionicity and for every median diameter and/or for every point of the grain size curve of the particles of mineral matter implemented.

Faced with the above-mentioned problems, the Applicant took the surprising step of developing aqueous suspensions of refined minerals with dry matter concentration that can be high, with low Brookfield™ that remains stable over time, and having a pigmentary surface area the ionic charge of which, determined by ionic titration, is very low, suspensions the implementation of which, both in the paper manufacturing processes and in the filler or in the paper sheet treatment processes such as coating, make it possible to solve the above-mentioned problems.

These aqueous suspensions of refined minerals with dry matter concentration that can be high, with low Brookfield™ that remains stable over time, and having a pigmentary surface area the ionic charge of which, determined by ionic titration, is low, are obtained by using a weakly charged polymer as a grinding agent of the mineral matter in aqueous suspension, or by using the same copolymer as dispersing agent of the filter cake obtained in an intermediary stage of the manufacture of the suspension, this intermediary stage taking place after grinding and possibly before a physical concentration process such as thermal concentration.

The said aqueous suspensions of refined mineral matter with dry matter concentration that can be high, with low Brookfield™ that remains stable over time, and having a pigmentary surface area the ionic charge of which, determined by ionic titration, is low, are characterized in that they contain, as a grinding aid agent, a copolymer consisting of:

a) at least one ethylenically unsaturated anionic monomer having a monocarboxyl function selected from among the ethylenically unsaturated monomers having a monocarboxyl function such as acrylic or methacrylic acid or hemiesters of diacids such as $C_1$ to $C_4$ monoesters of maleic or itaconic acid, or mixtures thereof, or having a dicarboxyl function selected from among the ethylenically unsaturated monomers having a dicarboxyl function such as crotonic, isocrotonic, cinnamic, itaconic, maleic acid, or anhydrides of carboxyl acids, such as maleic anhydride or having a sulfonic function selected from among the ethylenically unsaturated monomers having a sulfonic function such as acrylamido-methyl-propane-sulfonic acid, sodium methallylsulfonate, vinylsulfonic acid and styrenesulfonic acid or having a phosphoric function selected from among the ethylenically unsaturated monomers having a phosphoric function such as vinylphosphoric acid, ethylene glycol methacrylate phosphate, propylene glycol methacrylate phosphate, ethylene glycol acrylate phosphate, propylene glycol acrylate phosphate and their ethoxylates or having a phosphonic function selected from among the ethylenically unsaturated monomers having a phosphonic function such as vinylphosphonic acid, or mixtures thereof, b) at least one non-ionic ethylenically unsaturated monomer of formula (I):

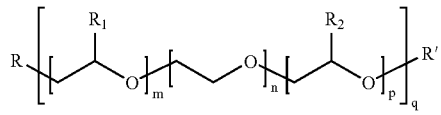

where m and p represent a number of alkylene oxide units less than or equal to 150 n represents a number of ethylene oxide units less than or equal to 150 q represents an integer equal to at least 1 and such that $5 \leq (m+n+p)q \leq 150$, and preferably represents an integer such that $15 \leq (m+n+p)q \leq 120$, $R_1$ represents hydrogen or the methyl or ethyl radical $R_2$ represents hydrogen or the methyl or ethyl radical R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, R' represents hydrogen or a hydrocarbon radical having from 1 to 40 carbon atoms, and preferably represents a hydrocarbon radical having from 1 to 12 carbon atoms and even more preferably a hydrocarbon radical having from 1 to 4 carbon atoms, or a mixture of several monomers of formula (I), c) at least one organofluorinated or organosilylated monomer, preferably selected from among the molecules of formulae (IIa) or (IIb) or (IIc) or mixtures thereof:

with formula (IIa)

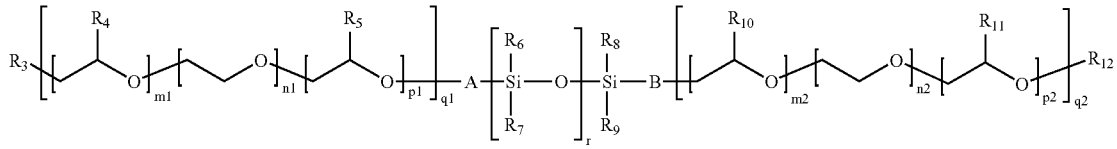

where m1, p1, m2 and p2 represent a number of alkylene oxide units less than or equal to 150 n1 and n2 represent a number of ethylene oxide units less than or equal to 150 q1 and q2 represent an integer equal to at least 1 and such that $0 \leq (m1+n1+p1)q1 \leq 150$ and $0 \leq (m2+n2+p2)q2 \leq 150$, r represents a number such that $1 \leq r \leq 200$ $R_3$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, $R_4$, $R_5$, $R_{10}$ and $R_{11}$ represent hydrogen or the methyl or ethyl radical $R_6$, $R_7$, $R_8$ and $R_9$ represent straight or branched alkyl, aryl, alkylaryl or arylalkyl groups having from 1 to 20 carbon atoms, or a mixture thereof $R_{12}$ represents a hydrocarbon radical having from 1 to 40 carbon atoms A and B are groups which may be present, in which case they represent a hydrocarbon radical having from 1 to 4 carbon atoms with formula (IIb)

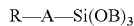

where

R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, A is a group which may be present, in which case it represents a hydrocarbon radical having from 1 to 4 carbon atoms B represents a hydrocarbon radical having from 1 to 4 carbon atoms, with formula (IIc)

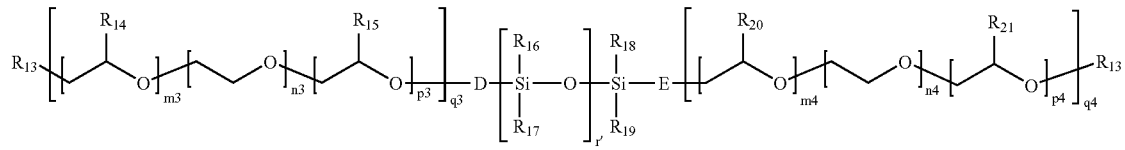

where:

m3, p3, m4 and p4 represent a number of alkylene oxide units less than or equal to 150 n3 and n4 represent a number of ethylene oxide units less than or equal to 150 q3 and q4 represent an integer equal to at least 1 and such that $0 \leq (m3+n3+p3)q3 \leq 150$ and $0 \leq (m4+n4+p4)q4 \leq 150$, r' represents a number such that $1 \leq r' \leq 200$, $R_{13}$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, $R_{14}, R_{15}, R_{20}$ and $R_{21}$ represent hydrogen or the methyl or ethyl radical $R_{16}, R_{17}, R_{18}$ and $R_{19}$ represent straight or branched alkyl, aryl, alkylaryl or arylalkyl groups having from 1 to 20 carbon atoms, or a mixture thereof D and E are groups which may be present, in which case they represent a hydrocarbon radical having from 1 to 4 carbon atoms, d) possibly at least one monomer of the acrylamide or methacrylamide type or their derivatives and mixtures thereof such as N-[3-(dimethylamino) propyl]acrylamide or N-[3-(dimethylamino) propyl]methacrylamide, and mixtures thereof, or at least one non water-soluble monomer such as the alkyl acrylates or methacrylates or mixtures thereof, unsaturated esters such as N-[2-(dimethylamino) ethyl]methacrylate, or N-[2-(dimethylamino) ethyl]acrylate or mixtures thereof, vinyls such as vinyl acetate, vinylpyrrolidone, styrene, alphamethylstyrene and their derivatives or mixtures thereof, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido) propyl]trimethyl ammonium chloride or sulphate, dimethyl diallyl ammonium chloride or sulphate, [3-(methacrylamido)propyl]trimethyl ammonium chloride or sulphate, or mixtures thereof e) possibly at least one crosslinking monomer selected, but not exclusively, from the group consisting of ethylene glycol dimethacrylate, trimethylolpropanetriacrylate, allyl acrylate, the allyl maleates, methylene-bis-acrylamide, methylene-bis-methacrylamide, tetrallyloxyethane, triallylcyanurates, allyl ethers prepared from polyols such as pentaerythritol, sorbitol, sucrose or others the total of the components a), b), c), d) and e) being equal to 100% and having an intrinsic viscosity less than or equal to 100 ml/g as determined in accordance with the method described in Vollmert publication "Outlines of macromolecular chemistry" volume III, Vollmert Verlag, Karlsruhe 1985 and by the implementation of a solution of demineralised water and a capillary tube defined in standard DIN 53101/0a, of constant 0.005 and diameter equal to 0.53 mm. This method will be referred to as the intrinsic viscosity method in this application.

A second method that can be used to determine the intrinsic viscosity uses a 6% solution of NaCl and the same equipment as described above.

In the examples where this second method is used in addition to the first method, the intrinsic viscosity values obtained using this second method correspond to the second value indicated.

Thus, in order to minimise the cationic agent demand when manufacturing the paper, for every median diameter and/or for every point of the grain size curve of the particles of mineral matter implemented and in order to provide, when coating the paper, coating colours which are highly stable for every median diameter and/or for every point of the grain size curve of the particles of mineral matter implemented, the prime aim of the invention is to provide such aqueous suspensions of refined mineral substances containing the above-mentioned copolymers.

Another aim of the invention is the use, as a grinding aid agent for mineral substances in aqueous suspension or as dispersing agent of the filter cake obtained in an intermediate stage of the manufacture of the suspension, said intermediate stage taking place after grinding and, if relevant, before a thermal concentration process, of a copolymer consisting of:

a) at least one ethylenically unsaturated anionic monomer having a monocarboxyl function selected from among the ethylenically unsaturated monomers having a monocarboxyl function such as acrylic or methacrylic acid or hemiesters of diacids such as $C_1$ to $C_4$ monoesters of maleic or itaconic acid, or mixtures thereof, or having a dicarboxyl function selected from among the ethylenically unsaturated monomers having a dicarboxyl function such as crotonic, isocrotonic, cinnamic, itaconic, maleic acid, or anhydrides of carboxyl acids, such as maleic anhydride or having a sulfonic function selected from among the ethylenically unsaturated monomers having a sulfonic function such as acrylamido-methyl-propane-sulfonic acid, sodium methallylsulfonate, vinylsulfonic acid and styrenesulfonic acid or having a phosphoric function selected from among the ethylenically unsaturated monomers having a phosphoric function such as vinylphosphoric acid, ethylene glycol methacrylate phosphate, propylene glycol methacrylate phosphate, ethylene glycol acrylate phosphate, propylene glycol acrylate phosphate and their ethoxylates or having a phosphonic function selected from among the ethylenically unsaturated monomers having a phosphonic function such as vinylphosphonic acid, or mixtures thereof, b) at least one non-ionic ethylenically unsaturated monomer of formula (I):

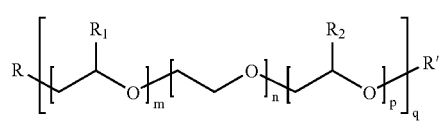

where
m and p represent a number of alkylene oxide units less than or equal to 150
n represents a number of ethylene oxide units less than or equal to 150
q represents an integer equal to at least 1 and such that $5 \leq (m+n+p)q \leq 150$, and preferably represents an integer such that $15 \leq (m+n+p)q \leq 120$,
$R_1$ represents hydrogen or the methyl or ethyl radical
$R_2$ represents hydrogen or the methyl or ethyl radical
R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
R' represents hydrogen or a hydrocarbon radical having from 1 to 40 carbon atoms, and preferably represents a hydrocarbon radical having from 1 to 12 carbon atoms and even more preferably a hydrocarbon radical having from 1 to 4 carbon atoms,
or a mixture of several monomers of formula (I), c) at least one organofluorinated or organosilylated monomer, preferably selected from among the molecules of formulae (IIa) or (IIb) or (IIc) or mixtures thereof:

with formula (IIa)

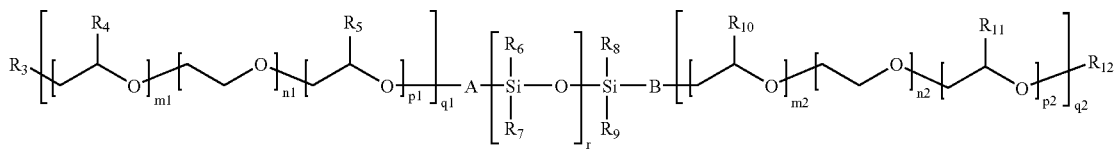

where
m1, p1, m2 and p2 represent a number of alkylene oxide units less than or equal to 150
n1 and n2 represent a number of ethylene oxide units less than or equal to 150
q1 and q2 represent an integer equal to at least 1 and such that $0 \leq (m1+n1+p1)q1 \leq 150$ and $0 \leq (m2+n2+p2)q2 \leq 150$,
r represents a number such that $1 \leq r \leq 200$
$R_3$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
$R_4$, $R_5$, $R_{10}$ and $R_{11}$ represent hydrogen or the methyl or ethyl radical
$R_6$, $R_7$, $R_8$ and $R_9$ represent straight or branched alkyl, aryl, alkylaryl or arylalkyl groups having from 1 to 20 carbon atoms, or a mixture thereof
$R_{12}$ represents a hydrocarbon radical having from 1 to 40 carbon atoms
A and B are groups which may be present, in which case they represent a hydrocarbon radical having from 1 to 4 carbon atoms, with formula (IIb)

where
R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
A is a group which may be present, in which case it represents a hydrocarbon radical having from 1 to 4 carbon atoms
B represents a hydrocarbon radical having from 1 to 4 carbon atoms, with formula (IIc)

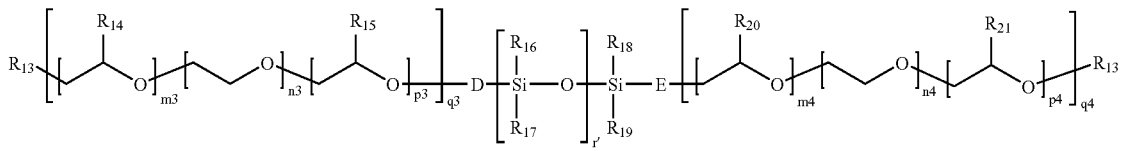

where
- m3, p3, m4 and p4 represent a number of alkylene oxide units less than or equal to 150
- n3 and n4 represent a number of ethylene oxide units less than or equal to 150
- q3 and q4 represent an integer equal to at least 1 and such that $0 \leq (m3+n3+p3)q3 \leq 150$ and $0 \leq (m4+n4+p4)q4 \leq 150$,
- r' represents a number such that $1 \leq r' \leq 200$,
- $R_{13}$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylutethane and allylurethane, and to the group of allyl or vinyl ethers, whether or not substituted, or to the group of ethylenically unsaturated amides or imides,
- $R_{14}$, $R_{15}$, $R_{20}$ and $R_{21}$ represent hydrogen or the methyl or ethyl radical
- $R_{16}$, $R_{17}$, $R_{18}$ and $R_{19}$ represent straight or branched alkyl, aryl, alkylaryl or arylalkyl groups having from 1 to 20 carbon atoms, or a mixture thereof
- D and E are groups which may be present, in which case they represent a hydrocarbon radical having from 1 to 4 carbon atoms,
- d) possibly at least one monomer of the acrylamide or methacrylamide type or their derivatives and mixtures thereof such as N-[3-(dimethylamino) propyl]acrylamide or N-[3-(dimethylamino) propyl]methacrylamide, and mixtures thereof, or at least one non water-soluble monomer such as the alkyl acrylates or methacrylates or mixtures thereof, unsaturated esters such as N-[2-(dimethylamino) ethyl]methacrylate, or N-[2-(dimethylamino) ethyl]acrylate or mixtures thereof, vinyls such as vinyl acetate, vinylpyrrolidone, styrene, alphamethylstyrene and their derivatives or mixtures thereof, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or mixtures thereof
- e) possibly, at least one crosslinking monomer selected, but not exclusively, from the group consisting of ethylene glycol dimethacrylate, trimethylolpropanetriacrylate, allyl acrylate, the allyl maleates, methylene-bis-acrylamide, methylene-bis-methacrylamide, tetrallyloxy-ethane, triallylcyanurates, allyl ethers prepared from polyols such as pentaerythritol, sorbitol, sucrose or others the total of the components a), b), c), d) and e) being equal to 100% and having an intrinsic viscosity less than or equal to 100 ml/g measured in accordance with the above-mentioned method.

Another aim of the invention is to provide a grinding process in aqueous suspension of mineral particles implementing said selected copolymers as a grinding agent.

Said copolymers implemented according to the invention furthermore present the advantage of reducing the formation of foam during the physical operation, such as grinding and/or pumping and/or stirring of mineral matter.

Moreover, another aim of the invention is to use said refined mineral aqueous suspensions as is or after drying in the field of paper, paint and plastics.

More particularly, another aim of the invention lies in using these refined mineral aqueous suspensions for paper filling, and more particularly in applications known as "wet-end" applications, i.e. applications in processes for manufacturing paper, board or analogous sheet where they are used as filler, whether directly or indirectly. Another aim also lies in the use of said refined mineral aqueous suspensions in the treatment of the paper, board or analogous sheet where they are used as coating colour filler.

Another aim also lies in the use of said refined mineral aqueous suspensions in the field of plastic, such as low density (LLDPE) and high density (HMW-HDPE) polyolefines, or breathable membranes, or polyvinyl chlorides (PVC) and more particularly in the field of PVCs such as rigid or flexible PVCs.

These goals are attained thanks to the use, as a grinding aid agent, of a copolymer consisting of:

a) at least one ethylenically unsaturated anionic monomer having a monocarboxyl function selected from among the ethylenically unsaturated monomers having a monocarboxyl function such as acrylic or methacrylic acid or hemiesters of diacids such as $C_1$ to $C_4$ monoesters of maleic or itaconic acid, or mixtures thereof, or having a dicarboxyl function selected from among the ethylenically unsaturated monomers having a dicarboxyl function such as crotonic, isocrotonic, cinnamic, itaconic, maleic acid, or anhydrides of carboxyl acids, such as maleic anhydride or having a sulfonic function selected from among the ethylenically unsaturated monomers having a sulfonic function such as acrylamido-methyl-propane-sulfonic acid, sodium methallylsulfonate, vinylsulfonic acid and styrenesulfonic acid or having a phosphoric function selected from among the ethylenically unsaturated monomers having a phosphoric function such as vinylphosphoric acid, ethylene glycol methacrylate phosphate, propylene glycol methacrylate phosphate, ethylene glycol acrylate phosphate, propylene glycol acrylate phosphate and their ethoxylates or having a phosphonic function selected from among the ethylenically unsaturated monomers having a phosphonic function such as vinylphosphonic acid, or mixtures thereof, b) at least one non-ionic ethylenically unsaturated monomer of formula (I):

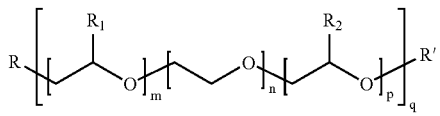

where
- m and p represent a number of alkylene oxide units less than or equal to 150
- n represents a number of ethylene oxide units less than or equal to 150
- q represents an integer equal to at least 1 and such that $5 \leq (m+n+p)q \leq 150$, and preferably represents an integer such that $15 \leq (m+n+p)q \leq 120$,
- $R_1$ represents hydrogen or the methyl or ethyl radical
- $R_2$ represents hydrogen or the methyl or ethyl radical
- R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
- R' represents hydrogen or a hydrocarbon radical having from 1 to 40 carbon atoms, and preferably represents a hydrocarbon radical having from 1 to 12 carbon atoms and even more preferably a hydrocarbon radical having from 1 to 4 carbon atoms, or a mixture of several monomers of formula (I), c) at least one organofluorinated or organosilylated monomer, preferably selected from among the molecules of formulae (IIa) or (IIb) or (IIc) or mixtures thereof:

with formula (IIa)

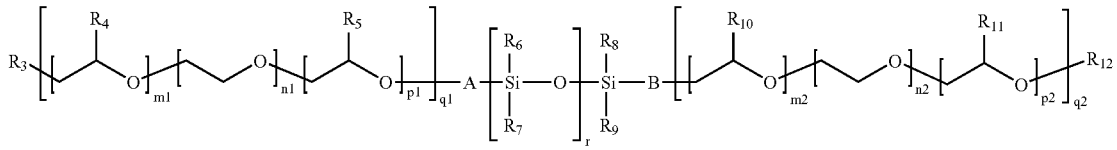

where
- m1, p1, m2 and p2 represent a number of alkylene oxide units less than or equal to 150
- n1 and n2 represent a number of ethylene oxide units less than or equal to 150
- q1 and q2 represent an integer equal to at least 1 and such that $0 \leq (m1+n1+p1)q1 \leq 150$ and $0 \leq (m2+n2+p2)q2 \leq 150$
- r represents a number such that $1 \leq r \leq 200$
- $R_3$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
- $R_4$, $R_5$, $R_{10}$ and $R_{11}$ represent hydrogen or the methyl or ethyl radical
- $R_6$, $R_7$, $R_8$ and $R_9$ represent straight or branched alkyl, aryl, alkylaryl or arylalkyl groups having from 1 to 20 carbon atoms, or a mixture thereof
- $R_{12}$ represents a hydrocarbon radical having from 1 to 40 carbon atoms
- A and B are groups which may be present, in which case they represent a hydrocarbon radical having from 1 to 4 carbon atoms, with formula (IIb)

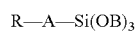

where
- R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
- A is a group which may be present, in which case it represents a hydrocarbon radical having from 1 to 4 carbon atoms,
- B represents a hydrocarbon radical having from 1 to 4 carbon atoms, with formula (IIc)

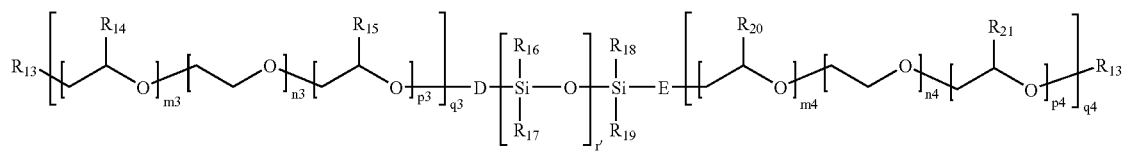

where
- m3, p3, m4 and p4 represent a number of alkylene oxide units less than or equal to 150
- n3 and n4 represent a number of ethylene oxide units less than or equal to 150
- q3 and q4 represent an integer equal to at least 1 and such that $0 \leq (m3+n3+p3)q3 \leq 150$ and $0 \leq (m4+n4+p4)q4 \leq 150$,
- r' represents a number such that $1 \leq r' \leq 200$,
- $R_{13}$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
- $R_{14}$, $R_{15}$, $R_{20}$ and $R_{21}$ represent hydrogen or the methyl or ethyl radical
- $R_{16}$, $R_{17}$, $R_{18}$ and $R_{19}$ represent straight or branched alkyl, aryl, alkylaryl or arylalkyl groups having from 1 to 20 carbon atoms, or a mixture thereof
- D and E are groups which may be present, in which case they represent a hydrocarbon radical having from 1 to 4 carbon atoms,
- d) possibly at least one monomer of the acrylamide or methacrylamide type or their derivatives and mixtures thereof such as N-[3-(dimethylamino)propyl]acrylamide or N-[3-(dimethylamino)propyl]methacrylamide, and mixtures thereof, or at least one non water-soluble monomer such as the alkyl acrylates or methacrylates or mixtures thereof, unsaturated esters such as N-[2-(dimethylamino)ethyl]methacrylate, or N-[2-(dimethylamino)ethyl]acrylate or mixtures thereof, vinyls such as vinyl acetate, vinylpyrrolidone, styrene, alphamethylstyrene and their derivatives or mixtures thereof, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or mixtures thereof
- e) possibly at least one crosslinking monomer selected, but not exclusively, from the group consisting of ethylene glycol dimethacrylate, trimethylolpropanetriacrylate, allyl acrylate, the allyl maleates, methylene-bis-acrylamide, methylene-bis-methacrylamide, tetrallyloxyethane, triallylcyanurates, allyl ethers prepared from polyols such as pentaerythritol, sorbitol, sucrose or others the total of the components a), b), c), d) and e) being equal to 100%.

and having an intrinsic viscosity less than or equal to 100 ml/g measured in accordance with the above-mentioned method.

More particularly, the aqueous suspensions of refined mineral substances according to the invention are characterized in that said copolymer consists, by weight, of:
- a) from 2% to 95%, preferably from 3% to 25%, and even more preferably from 4% to 15%, of at least one ethylenically unsaturated anionic monomer having a monocarboxyl function selected from among the ethylenically unsaturated monomers having a monocarboxyl function such as acrylic or methacrylic acid or hemiesters of diacids such as $C_1$ to $C_4$ monoesters of maleic or itaconic acid, or mixtures thereof, or having a dicarboxyl function selected from among the ethylenically unsaturated monomers having a dicarboxyl function such as crotonic, isocrotonic, cinnamic, itaconic, maleic acid, or anhydrides of carboxyl acids, such as maleic anhydride or having a sulfonic function selected from among the ethylenically unsaturated monomers having a sulfonic function such as acrylamido-methyl-propane-sulfonic acid, sodium methallylsulfonate, vinylsulfonic acid and styrenesulfonic acid or having a phosphoric function selected from among the ethylenically unsaturated monomers having a phosphoric function such as vinylphosphoric acid, ethylene glycol methacrylate phosphate, propylene glycol methacrylate phosphate, ethylene glycol acrylate phosphate, propylene glycol acrylate phosphate and their ethoxylates or having a phosphonic function selected from among the ethylenically unsaturated monomers having a phosphonic function such as vinylphosphonic acid, or mixtures thereof,
- b) From 97.9% to 4.9%, preferably from 95% to 65%, and even more preferably from 92% to 78%, of at least one non-ionic ethylenically unsaturated monomer of formula (I):

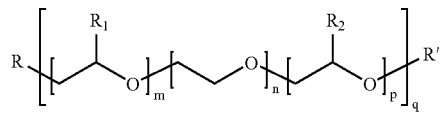

where
- m and p represent a number of alkylene oxide units less than or equal to 150
- n represents a number of ethylene oxide units less than or equal to 150
- q represents an integer equal to at least 1 and such that $5 \leq (m+n+p)q \leq 150$, and preferably represents an integer such that $15 \leq (m+n+p)q \leq 120$,
- $R_1$ represents hydrogen or the methyl or ethyl radical
- $R_2$ represents hydrogen or the methyl or ethyl radical
- R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
- R' represents hydrogen or a hydrocarbon radical having from 1 to 40 carbon atoms, and preferably represents a hydrocarbon radical having from 1 to 12 carbon atoms and even more preferably a hydrocarbon radical having from 1 to 4 carbon atoms, or a mixture of several monomers of formula (I),
- c) from 0.1% to 50%, preferably from 0.2% to 10%, and even more preferably from 0.3% to 5%, of at least one organofluorinated or organosilylated monomer, preferably selected from among the molecules of formulae (IIa) or (IIb) or (IIc) or mixtures thereof:

with formula (IIa)

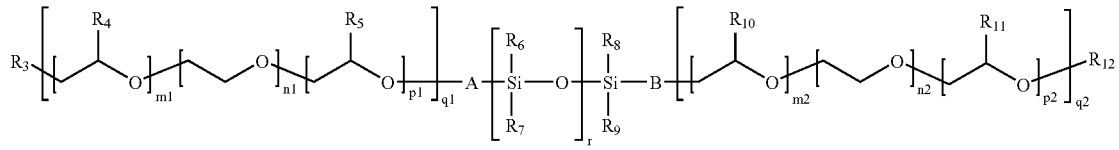

where
m1, p1, m2 and p2 represent a number of alkylene oxide units less than or equal to 150 n1 and n2 represent a number of ethylene oxide units less than or equal to 150 q1 and q2 represent an integer equal to at least 1 and such that $0 \leq (m1+n1+p1)q1 \leq 150$ and $0 \leq (m2+n2+p2)q2 \leq 150$, r represents a number such that $1 \leq r \leq 200$ $R_3$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, $R_4$, $R_5$, $R_{10}$ and $R_{11}$ represent hydrogen or the methyl or ethyl radical $R_6$, $R_7$, $R_8$ and $R_9$ represent straight or branched alkyl, aryl, alkylaryl or arylalkyl groups having from 1 to 20 carbon atoms, or a mixture thereof $R_{12}$ represents a hydrocarbon radical having from 1 to 40 carbon atoms A and B are groups which may be present, in which case they represent a hydrocarbon radical having from 1 to 4 carbon atoms, with formula (IIb)

R—A—Si(OB)$_3$ where
R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, A is a group which may be present, in which case it represents a hydrocarbon radical having from 1 to 4 carbon atoms, B represents a hydrocarbon radical having from 1 to 4 carbon atoms, with formula (IIc)

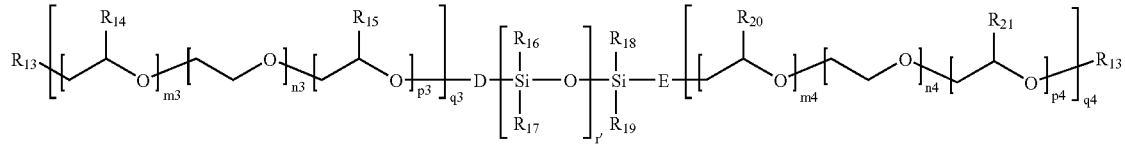

where
m3, p3, m4 and p4 represent a number of alkylene oxide units less than or equal to 150 n3 and n4 represent a number of ethylene oxide units less than or equal to 150 q3 and q4 represent an integer equal to at least 1 and such that $0 \leq (m3+n3+p3)q3 \leq 150$ and $0 \leq (m4+n4+p4)q4 \leq 150$, r' represents a number such that $1 \leq r' \leq 200$, $R_{13}$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, $R_{14}$, $R_{15}$, $R_{20}$ and $R_{21}$ represent hydrogen or the methyl or ethyl radical $R_{16}$, $R_{17}$, $R_{18}$ and $R_{19}$ represent straight or branched alkyl, aryl, alkylaryl or arylalkyl groups having from 1 to 20 carbon atoms, or a mixture thereof, D and E are groups which may be present, in which case they represent a hydrocarbon radical having from 1 to 4 carbon atoms, d) from 0% to 50%, preferably from 0% to 10%, and even more preferably from 0% to 5%, of at least one monomer of the acrylamide or methacrylamide type or their derivatives and mixtures thereof such as N-[3-(dimethylamino)propyl]acrylamide or N-[3-(dimethylamino)propyl]methacrylamide, and mixtures thereof, or at least one non water-soluble monomer such as the alkyl acrylates or methacrylates or mixtures thereof, unsaturated esters such as N-[2-(dimethylamino)ethyl]methacrylate, or N-[2-(dimethylamino)ethyl]acrylate or mixtures thereof, vinyls such as vinyl acetate, vinylpyrrolidone, styrene, alphamethylstyrene and their derivatives or mixtures thereof, or at least one cationic monomer or quaternary ammonium such as [2-(methacryloyloxy) ethyl]trimethyl ammonium chloride or sulphate, [2-(acryloyloxy)ethyl]trimethyl ammonium chloride or sulphate, dimethyl diallyl ammonium chloride or sulphate, [3-(methacrylamido)propyl]trimethyl ammonium chloride or sulphate, or mixtures thereof e) from 0% to 5%, preferably from 0% to 3%, of at least one crosslinking monomer selected, but not exclusively, from the group consisting of ethylene glycol dimethacrylate, trimethylolpropanetriacrylate, allyl acrylate, the allyl maleates, methylene-bis-acrylamide, methylene-bis-methacrylamide, tetrallyloxyethane, tri-allylcyanurates, allyl ethers prepared from polyols such as pentaerythritol, sorbitol, sucrose or others the total of the components a), b), c), d) and e) being equal to 100%, and in that said copolymer has an intrinsic viscosity less than or equal to 100 ml/g determined in accordance with the above-mentioned method.

More particularly, the aqueous suspensions of mineral matter according to the invention are characterized in that they contain from 0.05% to 10% of said co polymer by dry weight with respect to the dry weight of mineral substances.

Equally particularly, the aqueous suspensions of mineral matter according to the invention are characterized in that said copolymer is in its acid form, or partially or fully neutralized by one or more neutralizing agents.

These neutralizing agents are those that have a monovalent neutralizing function or a polyvalent neutralizing function such as, for example, for the monovalent function those selected from the group consisting of the alkaline cations, in particular sodium, potassium, lithium, ammonium or the primary, secondary or tertiary aliphatic and/or cyclic amines such as for example stearylamine, the ethanolamines (mono-, di-, triethanolamine), mono and diethylamine, cyclohexylamine, methylcyclohexylamine, aminomethylpropanol, morpholine or, for the polyvalent function, those selected from the group consisting of alkaline earth divalent cations, in particular magnesium and calcium, or zinc, and of the trivalent cations, including in particular aluminium, or of certain cations of higher valency.

Another variant of the invention consists in the fact that the aqueous suspensions of mineral matter according to the invention contain from 0.05% to 10% of said copolymer by dry weight with respect to the dry weight of mineral substances and at least one other dispersant or grinding aid agent.

Said other dispersant or grinding aid agent is then selected from those other dispersants or grinding agents familiar to the skilled man in the art such as, in particular, homopolymers or copolymers of acrylic acid in their acid forms, or fully or partially neutralized by one or more neutralizing agents, said neutralizing agents being selected from the same list as that referred to above, or is selected from among the dispersants or grinding aid agents such as, in particular, $H_3O^+$ ion donors of which phosphoric acid and/or its salts with mono and/or divalent bases such as soda or lime are particularly worthy of mention.

Specifically, the aqueous suspensions of mineral matter according to the invention contain from 0.05% to 1% by dry weight with respect to the dry weight of mineral substances of said other dispersants or grinding aid agents.

Equally particularly, the aqueous suspensions of mineral matter according to the invention are characterized in that they have a dry matter content of between 15% and 85% by weight, and preferably between 40% and 80%, and even more preferably between 50% and 78%.

In addition, the aqueous suspensions of mineral matter according to the invention are characterized in that the mineral matter is selected from among calcium carbonate and various analogous fillers such as dolomite, gypsum, calcium hydroxide, satin white, titanium dioxide, aluminium trihydroxide or mixed carbonate based fillers of various metals such as, in particular, calcium associated with magnesium and analogues, various matter such as talc or analogues, and mixtures of these fillers such as for example talc-calcium carbonate or calcium carbonate-kaolin mixtures, or mixtures of calcium carbonate with aluminium trihydroxide, the kaolins, calcine kaolins, mica or with synthetic or natural fibres or co-structures of minerals such as talc-calcium carbonate or talc-titanium dioxide co-structures.

Preferably, the aqueous suspensions of mineral matter according to the invention are characterized in that the mineral matter consists of calcium carbonate such as natural calcium carbonate selected from among marble, calcite, chalk or mixtures thereof.

These aqueous suspensions of mineral matter according to the invention are also characterized in that the mineral matter presents a median grain diameter, measured using the Sedigraph™ 5100, of between 50 µm and 0.1 µm, preferably between 5 µm and 0.2 µm and even more preferably between 2 µm and 0.5 µm.

These aqueous suspensions of mineral matter according to the invention are also characterized in that they have a pH of between 7.5 and 13, preferably between 8 and 12, and even more preferably between 8.5 and 10.

The use, according to the invention, of a copolymer as a grinding aid agent for mineral matter in aqueous suspension, is characterized in that said copolymer consists of:

a) at least one ethylenically unsaturated anionic monomer having a monocarboxyl function selected from among the ethylenically unsaturated monomers having a monocarboxyl function such as acrylic or methacrylic acid or hemiesters of diacids such as $C_1$ to $C_4$ monoesters of maleic or itaconic acid, or mixtures thereof, or having a dicarboxyl function selected from among the ethylenically unsaturated monomers having a dicarboxyl function such as crotonic, isocrotonic, cinnamic, itaconic, maleic acid, or anhydrides of carboxyl acids, such as maleic anhydride or having a sulfonic function selected from among the ethylenically unsaturated monomers having a sulfonic function such as acrylamido-methyl-propane-sulfonic acid, sodium methallylsulfonate, vinylsulfonic acid and styrenesulfonic acid or having a phosphoric function selected from among the ethylenically unsaturated monomers having a phosphoric function such as vinylphosphoric acid, ethylene glycol methacrylate phosphate, propylene glycol methacrylate phosphate, ethylene glycol acrylate phosphate, propylene glycol acrylate phosphate and their ethoxylates or having a phosphonic function selected from among the ethylenically unsaturated monomers having a phosphonic function such as vinylphosphonic acid, or mixtures thereof, b) at least one non-ionic ethylenically unsaturated monomer of formula (I):

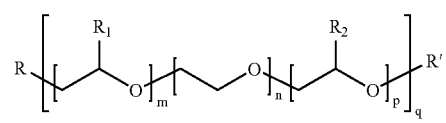

where
- m and p represent a number of alkylene oxide units less than or equal to 150
- n represents a number of ethylene oxide units less than or equal to 150
- q represents an integer equal to at least 1 and such that $5 \leq (m+n+p)q \leq 150$, and preferably represents an integer such that $15 \leq (m+n+p)q \leq 120$,
- $R_1$ represents hydrogen or the methyl or ethyl radical
- $R_2$ represents hydrogen or the methyl or ethyl radical
- R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
- R' represents hydrogen or a hydrocarbon radical having from 1 to 40 carbon atoms, and preferably represents a hydrocarbon radical having from 1 to 12 carbon atoms and even more preferably a hydrocarbon radical having from 1 to 4 carbon atoms, or a mixture of several monomers of formula (1), c) at least one organofluorinated or organosilylated monomer, preferably selected from among the molecules of formulae (IIa) or (IIb) or (IIc) or mixtures thereof:

with formula (IIa)

- $R_4$, $R_5$, $R_{10}$ and $R_{11}$ represent hydrogen or the methyl or ethyl radical
- $R_6$, $R_7$, $R_8$ and $R_9$ represent straight or branched alkyl, aryl, alkylaryl or arylalkyl groups having from 1 to 20 carbon atoms, or a mixture thereof
- $R_{12}$ represents a hydrocarbon radical having from 1 to 40 carbon atoms
- A and B are groups which may be present, in which case they represent a hydrocarbon radical having from 1 to 4 carbon atoms, with formula (IIb)

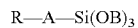

$$R-A-Si(OB)_3$$

where

R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of

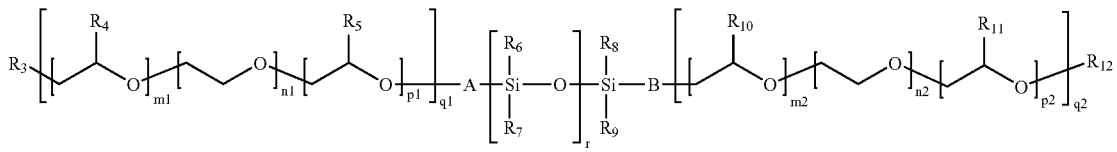

where
- m1, p1, m2 and p2 represent a number of alkylene oxide units less than or equal to 150
- n1 and n2 represent a number of ethylene oxide units less than or equal to 150
- q1 and q2 represent an integer equal to at least 1 and such that $0 \leq (m1+n1+p1)q1 \leq 150$ and $0 \leq (m2+n24p2)q2 \leq 150$,
- r represents a number such that $1 \leq r \leq 200$ allyl or vinyl ethers, whether or not substituted, or to the group of ethylenically unsaturated amides or imides, A is a group which may be present, in which case it represents a hydrocarbon radical having from 1 to 4 carbon atoms, B represents a hydrocarbon radical having from 1 to 4 carbon atoms, with formula (IIc)

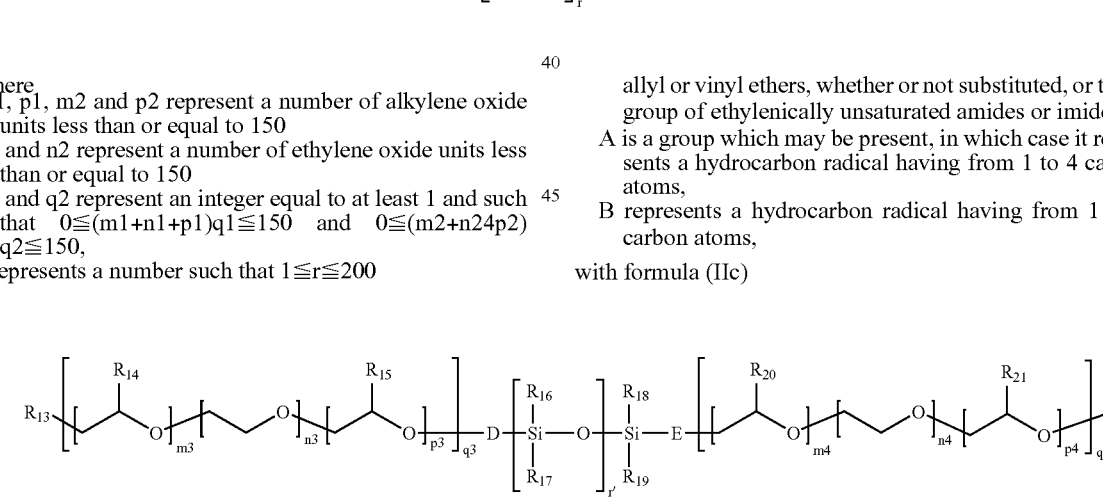

$R_3$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, where
- m3, p3, m4 and p4 represent a number of alkylene oxide units less than or equal to 150
- n3 and n4 represent a number of ethylene oxide units less than or equal to 150
- q3 and q4 represent an integer equal to at least 1 and such that $0 \leq (m3+n3+p3)q3 \leq 150$ and $0 \leq (m4+n4+p4)q4 \leq 150$,
- r' represents a number such that $1 \leq r' \leq 200$, $R_{13}$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, $R_{14}, R_{15}, R_{20}$ and $R_{21}$ represent hydrogen or the methyl or ethyl radical $R_{16}, R_{17}, R_{18}$ and $R_{19}$ represent straight or branched alkyl, aryl, alkylaryl or arylalkyl groups having from 1 to 20 carbon atoms, or a mixture thereof D and E are groups which may be present, in which case they represent a hydrocarbon radical having from 1 to 4 carbon atoms, d) possibly at least one monomer of the acrylamide or methacrylamide type or their derivatives and mixtures thereof such as N-[3-(dimethylamino)propyl]acrylamide or N-[3-(dimethylamino)propyl]methacrylamide, and mixtures thereof, or at least one non water-soluble monomer such as the alkyl acrylates or methacrylates or mixtures thereof, unsaturated esters such as N-[2-(dimethylamino)ethyl]methacrylate, or N-[2-(dimethylamino)ethyl]acrylate or mixtures thereof, vinyls such as vinyl acetate, vinylpyrrolidone, styrene, alphamethylstyrene and their derivatives or mixtures thereof, or at least one cationic monomer or quaternary ammonium such as [2-(methacryloyloxy)ethyl]trimethyl ammonium chloride or sulphate, [2-(acryloyloxy)ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or mixtures thereof e) possibly at least one crosslinking monomer selected, but not exclusively, from the group consisting of ethylene glycol dimethacrylate, trimethylolpropanetriacrylate, allyl acrylate, the allyl maleates, methylene-bis-acrylamide, methylene-bis-methacrylamide, tetrallyloxyethane, triallylcyanurates, allyl ethers prepared from polyols such as pentaerythritol, sorbitol, sucrose or others the total of the components a), b), c), d) and e) being equal to 100%.

and in that said copolymer has an intrinsic viscosity less than or equal to 100 ml/g determined in accordance with the above-mentioned method.

More particularly, the use of the above-mentioned copolymer is characterized in that said copolymer consists, in terms of weight, of:

a) from 2% to 95%, preferably from 3% to 25%, and even more preferably from 4% to 15%, of at least one ethylenically unsaturated anionic monomer having a monocarboxyl function selected from among the ethylenically unsaturated monomers having a monocarboxyl function such as acrylic or methacrylic acid or hemiesters of diacids such as $C_1$ to $C_4$ monoesters of maleic or itaconic acid, or mixtures thereof, or having a dicarboxyl function selected from among the ethylenically unsaturated monomers having a dicarboxyl function such as crotonic, isocrotonic, cinnamic, itaconic, maleic acid, or anhydrides of carboxyl acids, such as maleic anhydride or having a sulfonic function selected from among the ethylenically unsaturated monomers having a sulfonic function such as acrylamido-methyl-propane-sulfonic acid, sodium methallylsulfonate, vinylsulfonic acid and styrenesulfonic acid or having a phosphoric function selected from among the ethylenically unsaturated monomers having a phosphoric function such as vinylphosphoric acid, ethylene glycol methacrylate phosphate, propylene glycol methacrylate phosphate, ethylene glycol acrylate phosphate, propylene glycol acrylate phosphate and their ethoxylates or having a phosphonic function selected from among the ethylenically unsaturated monomers having a phosphonic function such as vinylphosphonic acid, or mixtures thereof, b) From 97.9% to 4.9%, preferably from 95% to 65%, and even more preferably from 92% to 78%, of at least one non-ionic ethylenically unsaturated monomer of formula (I):

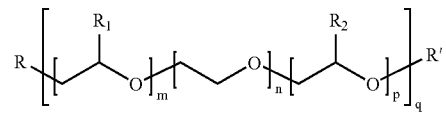

where m and p represent a number of alkylene oxide units less than or equal to 150 n represents a number of ethylene oxide units less than or equal to 150 q represents an integer equal to at least 1 and such that $5 \leq (m+n+p)q \leq 150$, and preferably represents an integer such that $15 \leq (m+n+p)q \leq 120$, $R_1$ represents hydrogen or the methyl or ethyl radical $R_2$ represents hydrogen or the methyl or ethyl radical R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, R' represents hydrogen or a hydrocarbon radical having from 1 to 40 carbon atoms, and preferably represents a hydrocarbon radical having from 1 to 12 carbon atoms and even more preferably a hydrocarbon radical having from 1 to 4 carbon atoms, or a mixture of several monomers of formula (I), c) from 0.1% to 50%, preferably from 0.2% to 10%, and even more preferably from 0.3% to 5%, of at least one-organofluorinated or organosilylated monomer, preferably selected from among the molecules of formulae (IIa) or (IIb) or (IIc) or mixtures thereof:

with formula (IIa)

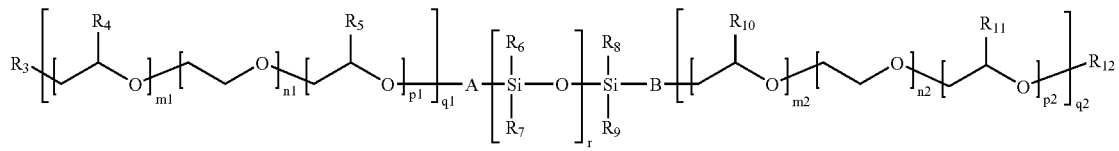

where m1, p1, m2 and p2 represent a number of alkylene oxide units less than or equal to 150 n1 and n2 represent a number of ethylene oxide units less than or equal to 150 q1 and q2 represent an integer equal to at least 1 and such that $0 \leq (m1+n1+p1)q1 \leq 150$ and $0 \leq (m2+n2+p2)q2 \leq 150$, r represents a number such that $1 \leq r \leq 200$ $R_3$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, $R_4$, $R_5$, $R_{10}$ and $R_{11}$ represent hydrogen or the methyl or ethyl radical $R_6$, $R_7$, $R_8$ and $R_9$ represent straight or branched alkyl, aryl, alkylaryl or arylalkyl groups having from 1 to 20 carbon atoms, or a mixture thereof $R_{12}$ represents a hydrocarbon radical having from 1 to 40 carbon atoms A and B are groups which may be present, in which case they represent a hydrocarbon radical having from 1 to 4 carbon atoms, with formula (IIb)

R—A—Si(OB)$_3$ where

R represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, A is a group which may be present, in which case it represents a hydrocarbon radical having from 1 to 4 carbon atoms, B represents a hydrocarbon radical having from 1 to 4 carbon atoms, with formula (IIc)

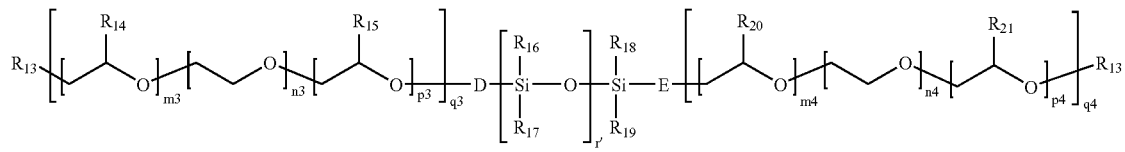

where m3, p3, m4 and p4 represent a number of alkylene oxide units less than or equal to 150 n3 and n4 represent a number of ethylene oxide units less than or equal to 150 q3 and q4 represent an integer equal to at least 1 and such that $0 \leq (m3+n3+p3)q3 \leq 150$ and $0 \leq (m4+n4+p4)q4 \leq 150$, r' represents a number such that $1 \leq r' \leq 200$, $R_{13}$ represents a radical containing a polymerizable unsaturated function, preferably belonging to the vinyl group and to the group of acrylic, methacrylic, maleic, itaconic, crotonic, and vinylphtalic esters and to the group of urethane unsaturates such as for example acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides, $R_{14}$, $R_{15}$, $R_{20}$ and $R_{21}$ represent hydrogen or the methyl or ethyl radical $R_{16}$, $R_{17}$, $R_{18}$ and $R_{19}$ represent straight or branched alkyl, aryl, alkylaryl or arylalkyl groups having from 1 to 20 carbon atoms, or a mixture thereof D and E are groups which may be present, in which case they represent a hydrocarbon radical having from 1 to 4 carbon atoms, d) from 0% to 50%, preferably from 0% to 10%, and even more preferably from 0% to 5%, of at least one monomer of the acrylamide or methacrylamide type or their derivatives or mixtures thereof such as N-[3-(dimethylamino)propyl]acrylamide or N-[3-(dimethylamino)propyl]methacrylamide, and mixtures thereof, or at least one non water-soluble monomer such as the alkyl acrylates or methacrylates or mixtures thereof, unsaturated esters such as N-[2-(dimethylamino)ethyl]methacrylate, or N-[2-(dimethylamino)ethyl]acrylate or mixtures thereof, vinyls such as vinyl acetate, vinylpyrrolidone, styrene, alphamethylstyrene and their derivatives or mixtures thereof, or at least one cationic monomer or quaternary ammonium such as [2-(methacryloyloxy) ethyl]trimethyl ammonium chloride or sulphate, [2-(acryloyloxy) ethyl]trimethyl ammonium chloride or sulphate, [3-(acrylamido)propyl]trimethyl ammonium chloride or sulphate, dimethyl diallyl ammonium chloride or sulphate, [3-(methacrylamido)propyl]trimethyl ammonium chloride or sulphate, or mixtures thereof e) from 0% to 5%, preferably from 0% to 3%, of at least one crosslinking monomer selected, but not exclusively, from the group consisting of ethylene glycol dimethacrylate, trimethylolpropanetriacrylate, allyl acrylate, the allyl maleates, methylene-bis-acrylamide, methylene-bis-methacrylamide, tetrallyloxyethane, triallylcyanurates, allyl ethers prepared from polyols such as pentaerythritol, sorbitol, sucrose or others.

the total of the components a), b), c), d) and e) being equal to 100%, and in that said copolymer has an intrinsic viscosity less than or equal to 100 ml/g determined in accordance with the above-mentioned method.

The copolymer used according to the invention is obtained by known radical copolymerization processes in solution, in direct or inverse emulsion, in suspension or precipitation in appropriate solvents, in the presence of known catalytic systems and transfer agents, or by means of controlled radical polymerization processes such as the method known as Reversible Addition Fragmentation Transfer (RAFT), the method known as Atom Transfer Radical Polymerization (ATRP), the method known as Nitroxide Mediated Polymerization (NMP), or the method known as Cobaloxime Mediated Free Radical Polymerization.

This copolymer obtained in acid form and possibly distilled can also be fully or partially neutralized using one or more neutralizing agents having a monovalent neutralizing function or a polyvalent neutralizing function such as, for example, for the monovalent function those selected from the group consisting of the alkaline cations, in particular sodium, potassium, lithium, ammonium or the primary, secondary or tertiary aliphatic and/or cyclic amines such as for example stearylamine, the ethanolamines (mono-, di-, triethanolamine), mono and diethylamine, cyclohexylamine, methylcyclohexylamine, aminomethylpropanol, morpholine or, for the polyvalent function those selected from the group consisting of alkaline-earth divalent cations, in particular magnesium and calcium, or zinc, and of the trivalent cations, including in particular aluminium, or of certain cations of higher valency.

Each neutralizing agent then operates according to neutralization rates proper to each valency function.

According to another variant, the copolymer obtained from the copolymerization reaction may, before or after the total or partial neutralization reaction, be treated and separated into several phases, according to statistical or dynamic processes known to the skilled man in the art, by one or more polar solvents belonging to the group consisting of water, methanol, ethanol, propanol, isopropanol, butanols, acetone, tetrahydrofurane or mixtures thereof.

One of the phases then corresponds to the copolymer used according to the invention as dispersing agent or grinding aid agent of mineral matter in aqueous suspension.

The invention also relates to said weakly ionic and water-soluble grinding aid agent of mineral substances in aqueous suspension having the property of being weakly charged. Said agent is characterized in that it is the above-described copolymer.

The invention also relates to the grinding process that implements said grinding aid agent of mineral substances in aqueous suspension.

In practice, according to the invention, grinding the mineral substance consists in refining said substance into very fine particles using a grinding body in an aqueous environment by means of the copolymer used as a grinding aid agent.

A variant consists in forming, by introducing the total quantity of the copolymer, an aqueous suspension of the mineral substance to be ground, the particles of which have an initial dimension equal to no more than 50 micrometres.

To the suspension of the mineral substance to be ground thus formed is added the grinding body of a grain size preferably between 0.20 millimetres and 4 millimetres. The grinding body is generally presented in the form of particles of materials as diverse as silicium oxide, aluminium oxide, zirconium oxide or mixtures thereof together with synthetic resins of great hardness, steels or others.

The grinding body is preferably added to the suspension in a quantity such that the ratio by weight between this material and the mineral substance to be ground is at least 2/1, this ratio preferably being between the limits 3/1 and 5/1.

The mixture of the suspension and the grinding body is then subjected to mechanical grinding action, such as that which occurs in a classical microelement grinder. The quantity of grinding aid agent introduced varies from 0.05% to 10% by dry weight of said copolymers with respect to the dry mass of the mineral substance to be refined.

The time necessary to obtain a highly refined mineral substance after grinding varies according to the nature and quantity of the mineral substances to be refined and according to the stirring mode used and the temperature of the medium during the grinding operation.

Another variant consists in using a part of the grinding aid agent before the grinding stage and implementing the rest of the quantity of the grinding agent during the grinding operation.

Finally, another variant consists in not implementing the copolymer before the grinding stage and using the entire quantity necessary during the grinding operation, which takes place in one or more stages.

Thus, according to the invention, the grinding process in aqueous suspension intended for pigmentary applications consisting in refining into very fine particles an aqueous suspension of said mineral materials is characterized in that use is made, as a grinding aid agent, of 0.05% to 10% by dry weight of the above-mentioned polymers with respect to the dry weight of mineral materials before and/or during the grinding stage.

Another mode of implementing the invention also consists in implementing, in addition to said copolymer used as a grinding agent, at least one other grinding agent before and/or during the grinding stage.

Thus, according to a variant, the grinding process according to the invention is characterized in that use is made, as a grinding aid agent, of 0.05% to 10% by dry weight of the above-mentioned polymers with respect to the dry weight of mineral materials and at least one other dispersant or grinding aid agent before and/or during the grinding stage.

Said other dispersant or grinding aid agent is then selected from those other dispersants or grinding aid agents familiar to the skilled man in the art such as, in particular, homopolymers or copolymers of acrylic acid in their acid forms, or fully or partially neutralized by one or more neutralizing agents, said neutralizing agents being selected from the same list as that referred to above, or is selected from among the dispersants or grinding aid agents such as, in particular, $H_3O^+$ ion donors of which phosphoric acid and/or its salts with mono and/or divalent bases such as soda or lime are particularly worthy of mention.

Particularly, the grinding process according to the invention is characterized in that use is made of 0.05% to 1.0%, by dry weight with respect to the dry weight of mineral substances, of said other dispersant or grinding aid agent.

The temperature during the course of the grinding stage and for all the variants of the grinding process according to the invention lies between 15° C. and 150° C., preferably between 50° C. and 105° C. and especially preferably between 60° C. and 98° C.

For mineral matter containing carbonate, the pH during the course of the grinding stage and for all the variants of the grinding process according to the invention lies between 6 and 13, preferably between 7.5 and 12 and especially preferably between 8 and 10.

For mineral matter not containing carbonate, the pH during the course of the grinding stage and for all the variants of the grinding process according to the invention lies between 2 and 13, preferably between 7.5 and 12 and especially preferably between 8 and 10.

When implementing these various grinding variants, apart from the problem that it resolves, the invention has the advantage that less foam is produced during grinding when using the copolymers than when using the polymers of the prior art.

Another advantage of the invention consists in the fact that the aqueous suspensions of mineral matter refined according to the invention always have grains of mineral matter having, for an equivalent grain size, a specific surface area less than the grains of mineral matter of the aqueous suspensions of mineral matter refined according to the prior art by implementing polyacrylate. This advantage is perceptible when the end user uses latex in coating formulations.

Thus the aqueous suspensions of mineral matter according to the invention are characterized in that the grains of mineral matter have, for an equivalent grain size, a BET specific surface area less than the grains of mineral matter of the aqueous suspensions of mineral matter refined using grinding aid agents such as polyacrylates, homopolymers or copolymers well known to the skilled man in the art.

The mineral substances to be refined according to the process of the invention can be of highly diverse origin such as calcium carbonate, dolomites, kaolins, calcine kaolins, talc, gypsum, titanium oxide, or aluminium trihydroxide or any other filler and/or pigment that has to be ground in order to be used in applications such as the manufacture of papers, board or analogues and are preferably calcium carbonate such as natural calcium carbonate selected from among marble, calcite, chalk or mixtures thereof.

The papers manufactured according to the invention are characterized in that they contain said aqueous suspensions of fillers and/or pigments according to the invention.

The scope and interest of the invention will be better perceived thanks to the following examples, which are not of a comprehensive nature.

EXAMPLE 1

This example illustrates, by comparison with comparable grain size, how to reduce the cationic polymer demand in the mass by implementing an aqueous suspension of calcium carbonate containing the copolymer used, according to the invention, as a grinding aid agent.

Test No. 1

This test illustrates the prior art and implements 0.27% by dry weight, with respect to the dry weight of calcium carbonate, of a sodium and magnesium polyacrylate of intrinsic viscosity equal to 7.8 ml/g according to the above-mentioned intrinsic viscosity method, to obtain, from a calcium carbonate with a median diameter of 15 µm, an aqueous suspension of ground calcium carbonate having a dry matter concentration equal to 65.5% by weight and having a grain size such that 61% by weight of the particles have a diameter of less than 2 µm, and 30% by weight of the particles have a diameter of less than 1 µm measured on the Sedigraph™ 5100 corresponding to a median diameter equal to 1.63 µm.

To do this, use is made of a Dyno-Mill™ type fixed-cylinder grinder with rotating impeller, the grinding body of which consists of zirconium based beads of a diameter between 0.6 millimetres and 1 millimetre.

The total volume occupied by the grinding body is 1000 cubic centimetres while its weight is 2700 g.

The grinding chamber has a volume of 1400 cubic centimetres.

The circumferential speed of the grinder is 10 metres per second.

The pigment suspension is recycled at a rate of 40 litres per hour.

The output of the Dyno-Mill is fitted with a 200-micron grade separator by means of which it is possible to separate the suspension that results from the grinding and the grinding body.

The temperature during each grinding test is maintained at approximately 60° C.

One hour after grinding is completed, a sample of the pigmentary suspension, the grain size of which (% of particles less than 2 micrometres) is measured using a Sedigraph™ 5100 particle size analyzer, is recovered in a beaker.

The Brookfield™ viscosity of the suspension is measured using a model RVT Brookfield™ viscometer, at a temperature of 23° C. and a rotation speed of 100 rpm with the appropriate 3 spindle.

Having left this sample lie in the beaker for 7 days, the Brookfield™ viscosity of the suspension is measured by introducing, into the unstitrred beaker, the appropriate spindle of the RVT model Brookfield™ viscometer, at a temperature of 23° C. and a rotation speed of 100 rpm. (AVAG viscosity=viscosity before stirring).

The same Brookfield™ viscosity measurements are also made once the beaker has been stirred for 5 minutes and constitute the APAG (after stirring) viscosity results.

The dry matter concentration (S.C.: Solid Content) and Brookfield™ viscosity results obtained are as follows:

S.C.=65.5%
Viscosity ($T_0$)=115 mPa.s
AVAG viscosity ($T_{7\ days}$)=620 mPa.s
APAG viscosity ($T_{7\ days}$)=155 mPa.s Once these Brookfield™ viscosity measurements have been made, the specific surface area and the cationic demand of the calcium carbonate are determined.

The BET specific surface area, determined according to standard ISO 9277, is equal to 7.2 $m^2/g$ The PDDPC cationic polymer demand, measured using the Mettler DL77 titrator and the Mütec PCD 02 detector using the cationic titration method implementing 0.005 mole of a solution of 20% of poly(N,N-dimethyl-3,5-dimethylene-piperidinium chloride (PDDPC) sold by Acros Organics is equal to 12100µ Val/kg, this value being the value corresponding to zero charge of the detector used.

Test No. 2

This test illustrates the prior art and implements 0.47% by dry weight, with respect to the dry weight of calcium carbonate, of a sodium and magnesium polyacrylate of intrinsic viscosity equal to 7.8 ml/g according to the above-mentioned intrinsic viscosity method, to obtain, from a calcium carbonate with a median diameter of 15 µm, and under the same operating conditions and using the same equipment as in test No. 1, an aqueous suspension of ground calcium carbonate having a dry matter concentration equal to 75% by weight and having a grain size such that 90% by weight of the particles have a diameter of less than 2 µm as measured on the Sedigraph™ 5100.

The dry matter concentration (S.C.: Solid Content) and Brookfield™ viscosity results obtained with the same measuring method as test No. 1 are as follows:

S.C.=75.8%
Viscosity ($T_0$)=265 mPa.s
AVAG viscosity ($T_{7\ days}$)=726 mPa.s
APAG viscosity ($T_{7\ days}$)=278 mPa.s Once these Brookfield™ viscosity measurements have been made, the specific surface area and the cationic demand of the calcium carbonate are determined using the same method as in test No. 1.

This gives a BET specific surface area equal to 12.0 m$^2$/g and a PDDPC cationic polymer demand equal to 20220μ Val/kg.

Test No. 3

This test illustrates the prior art and implements 0.79% by dry weight, with respect to the dry weight of calcium carbonate, of a sodium and magnesium polyacrylate of intrinsic viscosity equal to 7.8 ml/g according to the above-mentioned intrinsic viscosity method, to obtain, from a calcium carbonate with a median diameter of 15 μm, and under the same operating conditions and using the same equipment as in test No. 1, an aqueous suspension of ground calcium carbonate having a dry matter concentration equal to 76.5% by weight and having a grain size such that 78% by weight of the particles have a diameter of less than 1 μm as measured on the Sedigraph™ 5100.

The dry matter concentration (S.C.: Solid Content) and Brookfield™ viscosity results obtained with the same measuring method as test No. 1 are as follows:

S.C.=77.1%
Viscosity (T$_0$)=371 mPa.s
AVAG viscosity (T$_{7\ days}$)=886 mPa.s
APAG viscosity (T$_{7\ days}$)=412 mPa.s Once these Brookfield™ viscosity measurements have been made, the specific surface area and the cationic demand of the calcium carbonate are determined using the same method as in test No. 1.

This gives a BET specific surface area equal to 16.2 m$^2$/g and a PDDPC cationic polymer demand equal to 33990μ Val/kg.

Test No. 4

This test illustrates the prior art and implements 0.40% by dry weight, with respect to the dry weight of calcium carbonate, of a copolymer consisting, by weight, of:

14% acrylic acid
3% methacrylic acid
83% of polyethylene glycol methacrylate with a molecular weight of 2000 of intrinsic viscosity equal to 20.0 ml/g according to the above-mentioned intrinsic viscosity method, to obtain, from a calcium carbonate with a median diameter of 15 μm, and under the same operating conditions and using the same equipment as in test No. 1, an aqueous suspension of ground calcium carbonate having a dry matter concentration equal to 75% by weight and having a grain size such that 57% by weight of the particles have a diameter of less than 2 μm measured on the Sedigraph™ 5100.

The dry matter concentration (S.C.: Solid Content) and Brookfield™ viscosity results obtained with the same measuring method as test No. 1 are as follows:

S.C.=71.3%
Viscosity (T$_0$)=158 mPa.s
AVAG viscosity (T$_{7\ days}$)=677 mpa.s
APAG viscosity (T$_{7\ days}$)=254 mPa.s Once these Brookfield™ viscosity measurements have been made, the specific surface area and the cationic demand of the calcium carbonate are determined using the same method as in test No. 1.

This gives a BET specific surface area equal to 4.9 m$^2$;g and a PDDPC cationic polymer demand equal to 31001μ Val/kg.

Test No. 5

This test illustrates the prior art and implements 1.17% by dry weight, with respect to the dry weight of calcium carbonate, of the copolymer implemented in test No. 4 to obtain, from a calcium carbonate with a median diameter of 15 μm, and under the same operating conditions and using the same equipment as in test No. 1, an aqueous suspension of ground calcium carbonate having a dry matter concentration equal to 75% by weight and having a grain size such that 87% by weight of the particles have a diameter of less than 2 μm measured on the Sedigraph™ 5100.

The dry matter concentration (S.C.: Solid Content) and Brookfield™ viscosity results obtained with the same measuring method as test No. 1 are as follows:

S.C.=72.0%
Viscosity (T$_0$)=224 mPa.s
AVAG viscosity (T$_{7\ days}$)=987 mPa.s
APAG viscosity (T$_{7\ days}$)=248 mPa.s Once these Brookfield™ viscosity measurements have been made, the specific surface area and the cationic demand of the calcium carbonate are determined using the same method as in test No. 1.

This gives a BET specific surface area equal to 9.6 m$^2$/g and a PDDPC cationic polymer demand equal to 10000μ Val/kg.

In this test, a measurement was made of the foam by measuring the time a certain height of foam (height h in cm) took to form and the time necessary for this foam to disappear ($t_{disp}$).

In this test, t=90 seconds for h=23 cm and $t_{disp}$=5 minutes.

Test No. 6

This test illustrates the invention and implements 0.40% by dry weight, with respect to the dry weight of calcium carbonate, of a copolymer consisting, by weight, of:

a) 3.0% acrylic acid and 2.0% maleic acid
b) 94.0% of a monomer of formula (I) in which:
  R$_1$ represents hydrogen
  R$_2$ represents hydrogen
  R represents the vinyl group
  R' represents the methyl radical
  where m=p=0; n=114; q=1 and (m+n+p)q=114
c) 1.0% of a monomer of formula (IIb) in which
  R represents the methacrylate group
  A represents the propyl radical
  B represents the methyl radical of intrinsic viscosity equal to 39.5 ml/g according to the above-mentioned intrinsic viscosity method (and equal to 30.3 ml/g according to the second method), to obtain, from a calcium carbonate with a median diameter of 15 μm, and under the same operating conditions and using the same equipment as in test No. 1, an aqueous suspension of ground calcium carbonate having a dry matter concentration equal to 75% by weight and having a grain size such that 59% by weight of the particles have a diameter of less than 2 μm measured on the Sedigraph™ 5100 corresponding to a median diameter equal to 1.41 μm.

The dry matter concentration (S.C.: Solid Content) and Brookfield™ viscosity results obtained with the same measuring method as test No. 1 are as follows:

S.C.=75.2%
Viscosity (T$_0$)=125 mPa.s
AVAG viscosity (T$_{7\ days}$)=338 mPa.s
APAG viscosity (T$_{7\ days}$)=127 mPa.s Once these Brookfield™ viscosity measurements have been made, the specific surface area and the cationic demand of the calcium carbonate are determined using the same method as in test No. 1.

This gives a BET specific surface area equal to 4.8 m$^2$/g and a PDDPC cationic polymer demand equal to 590μ Val/kg.

It can thus be seen that the cationic polymer demand is lower than that of the prior art for equivalent grain size.

In this test, a measurement was made of the foam using the same operating procedure as in test No. 5 and the result was:

t=600 seconds for h=6 cm and $t_{disp}$=immediate.

These results show that much less foam is created than in the test of the prior art.

Test No. 7

This test illustrates the invention and implements 1.07% by dry weight, with respect to the dry weight of calcium carbonate, of the copolymer implemented in test No. 6 to obtain, from a calcium carbonate with a median diameter of 15 μm, and under the same operating conditions and using the same equipment as in test No. 1, an aqueous suspension of ground calcium carbonate having a dry matter concentration equal to 75% by weight and having a grain size such that 90% by weight of the particles have a diameter of less than 2 μm measured on the Sedigraph™ 5100, corresponding to a median diameter equal to 0.83 μm.

The dry matter concentration (S.C.: Solid Content) and Brookfield™ viscosity results obtained with the same measuring method as test No. 1 are as follows:

S.C.=75.4%

Viscosity $(T_0)$=241 mPa.s

AVAG viscosity $(T_{7\ days})$=359 mPa.s

APAG viscosity $(T_{7\ days})$=241 mPa.s

Once these Brookfield™ viscosity measurements have been made, the specific surface area and the cationic demand of the calcium carbonate are determined using the same method as in test No. 1.

This gives a BET specific surface area equal to 6.8 m$^2$/g and a PDDPC cationic polymer demand equal to 2340μ Val/kg.

It can thus be seen that the cationic polymer demand is lower than that of the prior art for equivalent grain size.

In this test, a measurement was made of the foam using the same operating procedure as in test No. 5 and the result was:

t=600 seconds for h=6 cm and $t_{disp}$=immediate.

These results show that much less foam is created than in the test of the prior art.

Test No. 8

This test illustrates the invention and implements 2.10% by dry weight, with respect to the dry weight of calcium carbonate, of the copolymer implemented in test No. 6 to obtain, from a calcium carbonate with a median diameter of 15 μm, and under the same operating conditions and using the same equipment as in test No. 1, an aqueous suspension of ground calcium carbonate having a dry matter concentration equal to 75% by weight and having a grain size such that 80% by weight of the particles have a diameter of less than 1 μm measured on the Sedigraph™ 5100, corresponding to a median diameter equal to 0.55 μm.

The dry matter concentration (S.C.: Solid Content) and Brookfield™ viscosity results obtained with the same measuring method as test No. 1 are as follows:

S.C.=75.0%

Viscosity $(T_0)$=717 mPa.s

AVAG viscosity $(T_{7\ days})$=1570 mPa.s

APAG viscosity $(T_{7\ days})$=697 mPa.s

Once these Brookfield™ viscosity measurements have been made, the specific surface area and the cationic demand of the calcium carbonate are determined using the same method as in test No. 1.

This gives a BET specific surface area equal to 8.4 m$^2$/g and a PDDPC cationic polymer demand equal to 4590μ Val/kg.

It can thus be seen that the cationic polymer demand is lower than that of the prior art for equivalent grain size.

In this test, a measurement was made of the foam using the same operating procedure as in test No. 5 and the result was:

t=600 seconds for h=6 cm and $t_{disp}$=immediate.

These results show that much less foam is created than in the test of the prior art.

Test No. 9

This test illustrates the invention and implements 0.40% by dry weight, with respect to the dry weight of calcium carbonate, of a copolymer consisting, by weight, of:

a) 8.7% acrylic acid and 1.5% methacrylic acid b) 89.4% of a monomer of formula (I) in which:

$R_1$ represents hydrogen $R_2$ represents hydrogen

R represents the methacrylate group

R' represents the methyl radical where m=p=0; n=114; q=1 and (m+n+p)q=114 c) 0.4% of a monomer of formula (IIb) in which

R represents the methacrylate group

A represents the propyl radical

B represents the methyl radical of intrinsic viscosity equal to 20.7 ml/g according to the above-mentioned intrinsic viscosity method, to obtain, from a calcium carbonate with a median diameter of 15 μm, and under the same operating conditions and using the same equipment as in test No. 1, an aqueous suspension of ground calcium carbonate having a dry matter concentration equal to 75% by weight and having a grain size such that 58% by weight of the particles have a diameter of less than 2 μm measured on the Sedigraph™ 5100.

The dry matter concentration (S.C.: Solid Content) and Brookfield™ viscosity results obtained with the same measuring method as test No. 1 are as follows:

S.C.=71.9%

Viscosity $(T_0)$=138 mPa.s

AVAG viscosity $(T_{7\ days})$=486 mPa.s

APAG viscosity $(T_{7\ days})$=159 mPa.s

Once these Brookfield™ viscosity measurements have been made, the specific surface area and the cationic demand of the calcium carbonate are determined using the same method as in test No. 1.

This gives a BET specific surface area equal to 4.8 m$^2$/g and a PDDPC cationic polymer demand equal to 340μ Val/kg.

It can thus be seen that the cationic polymer demand is lower than that of the prior art for equivalent grain size.

In this test, a measurement was made of the foam using the same operating procedure as in test No. 5 and the result was:

t=510 seconds for h=23 cm $t_{disp}$=2 minutes.

These results show that much less foam is created than in the test of the prior art.

Test No. 10

This test illustrates the invention and implements 1.10% by dry weight, with respect to the dry weight of calcium carbonate, of the copolymer implemented in test No. 9 to obtain, from a calcium carbonate with a median diameter of 15 μm, and under the same operating conditions and using the same equipment as in test No. 1, an aqueous suspension of ground calcium carbonate having a dry matter concentration equal to 75% by weight and having a grain size such that 89% by weight of the particles have a diameter of less than 2 μm measured on the Sedigraph™ 5100.

The dry matter concentration (S.C.: Solid Content) and Brookfield™ viscosity results obtained with the same measuring method as test No. 1 are as follows:

S.C.=73.5%

Viscosity $(T_0)$=164 mPa.s

AVAG viscosity $(T_{7\ days})$=593 mPa.s

APAG viscosity $(T_{7\ days})$=175 mPa.s

Once these Brookfield™ viscosity measurements have been made, the specific surface area and the cationic demand of the calcium carbonate are determined using the same method as in test No. 1.

This gives a BET specific surface area equal to 7.8 m$^2$/g and a PDDPC cationic polymer demand equal to 2770μ Val/kg.

It can thus be seen that the cationic polymer demand is lower than that of the prior art for equivalent grain size.

In this test, a measurement was made of the foam using the same operating procedure as in test No. 5 and the result was:

t=510 seconds for h=23 cm and $t_{disp}$=2 minutes.

These results show that much less foam is created than in the test of the prior art.

Test No. 11

This test illustrates the invention and implements 2.08% by dry weight, with respect to the dry weight of calcium carbonate, of the copolymer implemented in test No. 9 to obtain, from a calcium carbonate with a median diameter of 15 μm, and under the same operating conditions and using the same equipment as in test No. 1, an aqueous suspension of ground calcium carbonate having a dry matter concentration equal to 75% by weight and having a grain size such that 81% by weight of the particles have a diameter of less than 1 μm measured on the Sedigraph™ 5100.

The dry matter concentration (S.C.: Solid Content) and Brookfield™ viscosity results obtained with the same measuring method as test No. 1 are as follows:

S.C.=74.7%

Viscosity $(T_0)$=712 mPa.s

AVAG viscosity $(T_{7\ days})$=2240 mPa.s

APAG viscosity $(T_{7\ days})$=686 mPa.s

Once these Brookfield™ viscosity measurements have been made, the specific surface area and the cationic demand of the calcium carbonate are determined using the same method as in test No. 1.

This gives a BET specific surface area equal to 4.8 m$^2$/g and a PDDPC cationic polymer demand equal to 7050μ Val/kg.

It can thus be seen that the cationic polymer demand is lower than that of the prior art for equivalent grain size.

In this test, a measurement was made of the foam using the same operating procedure as in test No. 5 and the result was:

t=510 seconds for h=23 cm and $t_{disp}$=2 minutes.

These results show that much less foam is created than in the test of the prior art.

Test No. 12

This test illustrates the invention and implements 0.40% by dry weight, with respect to the dry weight of calcium carbonate, of a copolymer consisting, by weight, of:

a) 8.7% acrylic acid and 1.5% methacrylic acid b) 89.5% of a monomer of formula (I) in which:

R$_1$ represents hydrogen

R$_2$ represents hydrogen

R represents the methacrylate group

R' represents the methyl radical where m=p=0; n=114; q=1 and (m+n+p)q=114 c) 0.3% of a monomer of formula (IIb) in which

R represents the vinyl group

A is absent

B represents the methyl radical of intrinsic viscosity equal to 20.4 ml/g according to the above-mentioned intrinsic viscosity method, to obtain, from a calcium carbonate with a median diameter of 15 μm, and under the same operating conditions and using the same equipment as in test No. 1, an aqueous suspension of ground calcium carbonate having a dry matter concentration equal to 75% by weight and having a grain size such that 58% by weight of the particles have a diameter of less than 2 μm measured on the Sedigraph™ 5100.

The dry matter concentration (S.C.: Solid Content) and Brookfield™ viscosity results obtained with the same measuring method as test No. 1 are as follows:

S.C.=73.0%

Viscosity $(T_0)$=144 mPa.s

AVAG viscosity $(T_{7\ days})$=628 mPa.s

APAG viscosity $(T_{7\ days})$=171 mPa.s

Once these Brookfield™ viscosity measurements have been made, the specific surface area and the cationic demand of the calcium carbonate are determined using the same method as in test No. 1.

This gives a BET specific surface area equal to 4.8 m$^2$/g and a PDDPC cationic polymer demand equal to 880μ Val/kg.

It can thus be seen that the cationic polymer demand is lower than that of the prior art for equivalent grain size.

In this test, a measurement was made of the foam using the same operating procedure as in test No. 5 and the result was:

t=180 seconds for h=23 cm and $t_{disp}$=3 minutes.

These results show that less foam is created than in the test of the prior art.

Test No. 13

This test illustrates the invention and implements 1.10% by dry weight, with respect to the dry weight of calcium carbonate, of the copolymer implemented in test No. 12 to obtain, from a calcium carbonate with a median diameter of 15 μm, and under the same operating conditions and using the same equipment as in test No. 1, an aqueous suspension of ground calcium carbonate having a dry matter concentration equal to 75% by weight and having a grain size such that 90% by weight of the particles have a diameter of less than 2 μm measured on the Sedigraph™ 5100.

The dry matter concentration (S.C.: Solid Content) and Brookfield™ viscosity results obtained with the same measuring method as test No. 1 are as follows:

S.C.=73.1%

Viscosity $(T_0)$=195 mPa.s

AVAG viscosity $(T_{7\ days})$=731 mPa.s

APAG viscosity $(T_{7\ days})$=185 mPa.s

Once these Brookfield™ viscosity measurements have been made, the specific surface area and the cationic demand of the calcium carbonate are determined using the same method as in test No. 1.

This gives a BET specific surface area equal to 8.1 m$^2$/g and a PDDPC cationic polymer demand equal to 3760μ Val/kg.

It can thus be seen that the cationic polymer demand is lower than that of the prior art for equivalent grain size.

In this test, a measurement was made of the foam using the same operating procedure as in test No. 5 and the result was:

t=180 seconds for h=23 cm and $t_{disp}$=3 minutes.

These results show that less foam is created than in the test of the prior art.

Test No. 14

This test illustrates the invention and implements 2.10% by dry weight, with respect to the dry weight of calcium carbonate, of the copolymer implemented in test No. 12 to obtain, from a calcium carbonate with a median diameter of 15 μm, and under the same operating conditions and using the same equipment as in test No. 1, an aqueous suspension of ground calcium carbonate having a dry matter concentration equal to 75% by weight and having a grain size such that 83% by weight of the particles have a diameter of less than 1 μm measured on the Sedigraph™ 5100.

The dry matter concentration (S.C.: Solid Content) and Brookfield™ viscosity results obtained with the same measuring method as test No. 1 are as follows:

S.C.=74.3%

Viscosity $(T_0)$=613 mPa.s

AVAG viscosity $(T_{7\ days})$=3030 mPa.s

APAG viscosity $(T_{7\ days})$=650 mPa.s

Once these Brookfield™ viscosity measurements have been made, the specific surface area and the cationic demand of the calcium carbonate are determined using the same method as in test No. 1.

This gives a BET specific surface area equal to 11.1 $m^2/g$ and a PDDPC cationic polymer demand equal to 7180µ Val/kg.

It can thus be seen that the cationic polymer demand is lower than that of the prior art for equivalent grain size.

In this test, a measurement was made of the foam using the same operating procedure as in test No. 5 and the result was:

t=180 seconds for h=23 cm and $t_{disp}$=3 minutes.

These results show that less foam is created than in the test of the prior art.

Test No. 15

This test illustrates the invention and implements 0.40% by dry weight, with respect to the dry weight of calcium carbonate, of a copolymer consisting, by weight, of:

a) 8.5% acrylic acid and 1.5% methacrylic acid b) 87.0% of a monomer of formula (I) in which:

$R_1$ represents hydrogen $R_2$ represents hydrogen

R represents the methacrylate group

R' represents the methyl radical where m=p=0; n=114; q=1 and (m+n+p)q=114 c) 3.0% of a monomer of formula (IIb) in which

R represents the methacrylate group

A represents the propyl radical

B represents the methyl radical of intrinsic viscosity equal to 23.2 ml/g according to the above-mentioned intrinsic viscosity method, to obtain, from a calcium carbonate with a median diameter of 15 µm, and under the same operating conditions and using the same equipment as in test No. 1, an aqueous suspension of ground calcium carbonate having a dry matter concentration equal to 75% by weight and having a grain size such that 58% by weight of the particles have a diameter of less than 2 µm as measured on the Sedigraph™ 5100.

The dry matter concentration (S.C.: Solid Content) and Brookfield™ viscosity results obtained with the same measuring method as test No. 1 are as follows:

S.C.=73.7%

Viscosity $(T_0)$=156 mPa.s

AVAG viscosity $(T_{7\ days})$=733 mPa.s

APAG viscosity $(T_{7\ days})$=197 mPa.s

Once these Brookfield™ viscosity measurements have been made, the specific surface area and the cationic demand of the calcium carbonate are determined using the same method as in test No. 1.

This gives a BET specific surface area equal to 4.9 $m^2/g$ and a PDDPC cationic polymer demand equal to 1280µ Val/kg.

It can thus be seen that the cationic polymer demand is lower than that of the prior art for equivalent grain size.

In this test, a measurement was made of the foam using the same operating procedure as in test No. 5 and the result was:

t=150 seconds for h=23 cm and $t_{disp}$=4 minutes.

These results show that less foam is created than in the test of the prior art.

Test No. 16

This test illustrates the invention and implements 1.25% by dry weight, with respect to the dry weight of calcium carbonate, of the copolymer implemented in test No. 15 to obtain, from a calcium carbonate with a median diameter of 15 µm, and under the same operating conditions and using the same equipment as in test No. 1, an aqueous suspension of ground calcium carbonate having a dry matter concentration equal to 75% by weight and having a grain size such that 87% by weight of the particles have a diameter of less than 2 µm measured on the Sedigraph™ 5100.

The dry matter concentration (S.C.: Solid Content) and Brookfield™ viscosity results obtained with the same measuring method as test No. 1 are as follows:

S.C.=75.9%

Viscosity $(T_0)$=196 mPa.s

AVAG viscosity $(T_{7\ days})$=642 mPa.s

APAG viscosity $(T_{7\ days})$=189 mPa.s

Once these Brookfield™ viscosity measurements have been made, the specific surface area and the cationic demand of the calcium carbonate are determined using the same method as in test No. 1.

This gives a BET specific surface area equal to 7.6 $m^2/g$ and a PDDPC cationic polymer demand equal to 4150µ Val/kg.

It can thus be seen that the cationic polymer demand is lower than that of the prior art for equivalent grain size.

In this test, a measurement was made of the foam using the same operating procedure as in test No. 5 and the result was:

t=150 seconds for h=23 cm and $t_{disp}$=4 minutes.

These results show that less foam is created than in the test of the prior art.

Test No. 17

This test illustrates the invention and implements 2.08% by dry weight, with respect to the dry weight of calcium carbonate, of the copolymer implemented in test No. 15 to obtain, from a calcium carbonate with a median diameter of 15 µm, and under the same operating conditions and using the same equipment as in test No. 1, an aqueous suspension of ground calcium carbonate having a dry matter concentration equal to 75% by weight and having a grain size such that 81% by weight of the particles have a diameter of less than 1 µm measured on the Sedigraph™ 5100.

The dry matter concentration (S.C.: Solid Content) and Brookfield™ viscosity results obtained with the same measuring method as test No. 1 are as follows:

S.C.=77.0%

Viscosity $(T_0)$=648 mPa.s

AVAG viscosity $(T_{7\ days})$=2840 mPa.s

APAG viscosity $(T_{7\ days})$=747 mPa.s

Once these Brookfield™ viscosity measurements have been made, the specific surface area and the cationic demand of the calcium carbonate are determined using the same method as in test No. 1.

This gives a BET specific surface area equal to 9.3 $m^2/g$ and a PDDPC cationic polymer demand equal to 6900µ Val/kg.

It can thus be seen that the cationic polymer demand is lower than that of the prior art for equivalent grain size.

In this test, a measurement was made of the foam using the same operating procedure as in test No. 5 and the result was:

t=150 seconds for h=23 cm and $t_{disp}$=4 minutes.

These results show that less foam is created than in the test of the prior art.

Test No. 18

This test illustrates the invention and implements 0.79% by dry weight, with respect to the dry weight of calcium carbonate, of a copolymer consisting, by weight, of:
- a) 8.5% acrylic acid and 1.5% methacrylic acid
- b) 87.0% of a monomer of formula (I) in which:
  - $R_1$ represents hydrogen
  - $R_2$ represents hydrogen
  - R represents the methacrylate group
  - R' represents the methyl radical
  - where m=p=0; n=114; q=1 and (m+n+p)q=114
- c) 3.0% of a monomer of formula (IIb) in which
  - R represents the vinyl group
  - A is absent
  - B represents the methyl radical of intrinsic viscosity equal to 20.0 ml/g according to the above-mentioned intrinsic viscosity method, to obtain, from a calcium carbonate with a median diameter of 15 μm, and under the same operating conditions and using the same equipment as in test No. 1, an aqueous suspension of ground calcium carbonate having a dry matter concentration equal to 75% by weight and having a grain size such that 63% by weight of the particles have a diameter of less than 2 μm measured on the Sedigraph™ 5100.

The dry matter concentration (S.C.: Solid Content) and Brookfield™ viscosity results obtained with the same measuring method as test No. 1 are as follows:

S.C.=74.5%

Viscosity $(T_0)$=145 mPa.s

AVAG viscosity $(T_{7\ days})$=285 mPa.s

APAG viscosity $(T_{7\ days})$=112 mPa.s

Once these Brookfield™ viscosity measurements have been made, the cationic demand of the calcium carbonate is determined using the same method as in test No. 1. This gives a PDDPC cationic polymer demand equal to 2500μ Val/kg.

It can thus be seen that the cationic polymer demand is lower than that of the prior art for equivalent grain size.

Test No. 19

This test illustrates the invention and implements 1.10% by dry weight, with respect to the dry weight of calcium carbonate, of the copolymer implemented in test No. 18 to obtain, from a calcium carbonate with a median diameter of 15 μm, and under the same operating conditions and using the same equipment as in test No. 1, an aqueous suspension of ground calcium carbonate having a dry matter concentration equal to 75% by weight and having a grain size such that 93% by weight of the particles have a diameter of less than 2 μm measured on the Sedigraph™ 5100.

The dry matter concentration (S.C.: Solid Content) and Brookfield™ viscosity results obtained with the same measuring method as test No. 1 are as follows:

S.C.=74.0%

Viscosity $(T_0)$=249 mPa.s

AVAG viscosity $(T_{7\ days})$=1260 mPa.s

APAG viscosity $(T_{7\ days})$=279 mPa.s

Once these Brookfield™ viscosity measurements have been made, the cationic demand of the calcium carbonate is determined using the same method as in test No. 1. This gives a PDDPC cationic polymer demand equal to 4040μ Val/kg.

It can thus be seen that the cationic polymer demand is lower than that of the prior art for equivalent grain size.

Test No. 20

This test illustrates the invention and implements 2.10% by dry weight, with respect to the dry weight of calcium carbonate, of the copolymer implemented in test No. 18 to obtain, from a calcium carbonate with a median diameter of 15 μm, and under the same operating conditions and using the same equipment as in test No. 1, an aqueous suspension of ground calcium carbonate having a dry matter concentration equal to 75% by weight and having a grain size such that 83% by weight of the particles have a diameter of less than 1 μm measured on the Sedigraph™ 5100.

The dry matter concentration (S.C.: Solid Content) and Brookfield™ viscosity results obtained with the same measuring method as test No. 1 are as follows:

S.C.=74.3%

Viscosity $(T_0)$=808 mPa.s

AVAG viscosity $(T_{7\ days})$=3000 mPa.s

APAG viscosity $(T_{7\ days})$=802 mPa.s

Once these Brookfield™ viscosity measurements have been made, the cationic demand of the calcium carbonate is determined using the same method as in test No. 1.

This gives a PDDPC cationic polymer demand equal to 7710μ Val/kg.

It can thus be seen that the cationic polymer demand is lower than that of the prior art for equivalent grain size.

Test No. 21

This test illustrates the invention and implements 0.27% by dry weight, with respect to the dry weight of calcium carbonate, of the copolymer implemented in test No. 6 to obtain, from a calcium carbonate with a median diameter of 15 μm, and under the same operating conditions and using the same equipment as in test No. 1, an aqueous suspension of ground calcium carbonate having a dry matter concentration equal to 65.1% by weight and having a grain size such that 60% by weight of the particles have a diameter of less than 2 μm measured on the Sedigraph™, corresponding to a median diameter equal to 1.50 μm.

The dry matter concentration (S.C.: Solid Content) and Brookfield™ viscosity results obtained with the same measuring method as test No. 1 are as follows:

S.C.=65.1%

Viscosity $(T_0)$=183 mPa.s

AVAG viscosity $(T_{7\ days})$=354 mPa.s

APAG viscosity $(T_{7\ days})$=205 mPa.s

Once these Brookfield™ viscosity measurements have been made, the cationic demand is determined using the same method as in test No. 1.

This gives a PDDPC cationic polymer demand equal to 410μ Val/kg.

It can thus be seen that the cationic polymer demand is lower than that of the prior art for equivalent grain size.

In this test, a measurement was made of the foam using the same operating procedure as in test No. 5 and the result was:

t=600 seconds for h=6 cm and $t_{disp}$=immediate.

These results show that much less foam is created than in the test of the prior art.

Test No. 22

This test illustrates the invention and implements 0.40% by dry weight, with respect to the dry weight of calcium carbonate, of the copolymer implemented in test No. 6 to obtain, from a calcium carbonate with a median diameter of 15 μm, and under the same operating conditions and using the same equipment as in test No. 1, an aqueous suspension of ground calcium carbonate having a dry matter concentration equal to 76.0% by weight and having a grain size such that 74% by weight of the particles have a diameter of less than 2 μm, and 39% by weight of the particles have a diameter of less than 1 μm measured on the Sedigraph™, corresponding to a median diameter equal to 1.25 μm.

The dry matter concentration (S.C.: Solid Content) and Brookfield™ viscosity results obtained with the same measuring method as test No. 1 are as follows:

S.C.=76.0%
Viscosity $(T_0)$=295 mPa.s
AVAG viscosity $(T_{7\ days})$=505 mPa.s
APAG viscosity $(T_{7\ days})$=195 mPa.s Once these Brookfield™ viscosity measurements have been made, the cationic demand of the calcium carbonate is determined using the same method as in test No. 1.

This gives a PDDPC cationic polymer demand equal to 550µ Val/kg.

It can thus be seen that the cationic polymer demand is lower than that of the prior art for equivalent grain size.

In this test, a measurement was made of the foam using the same operating procedure as in test No. 5 and the result was:

t=600 seconds for h=6 cm and $t_{disp}$=immediate.

These results show that much less foam is created than in the test of the prior art.

EXAMPLE 2

This example illustrates the link between filler retention in filling and cationic polymer demand.

Test No. 23

This test illustrates the prior art and implements 0.27% by dry weight, with respect to the dry weight of calcium carbonate, of a sodium and magnesium polyacrylate of intrinsic viscosity equal to 7.8 ml/g according to the above-mentioned intrinsic viscosity method, to obtain, from a calcium carbonate with a median diameter of 15 µm, an aqueous suspension of ground calcium carbonate having a dry matter concentration equal to 65.5% by weight and having a grain size such that 61% by weight of the particles have a diameter of less than 2 µm and 30% by weight of the particles have a diameter of less than 1 µm measured on the Sedigraph™ 5100 corresponding to a median diameter equal to 1.63 µm.

The dry matter concentration (S.C.: Solid Content) and Brookfield™ viscosity results obtained with the same measuring method as test No. 1 are as follows:

S.C.=65.5%
Viscosity $(T_0)$=115 mPa.s
AVAG viscosity $(T_{7\ days})$=620 mPa.s
APAG viscosity $(T_{7\ days})$=155 mPa.s Filler retention in the filling is determined using the method described below and simulating prevalent conditions for a sheet of paper of a grammage equal to 80 g/m² and charged to 20% by weight.

The filler retention value then corresponds to the equation $$\text{Filler retention} = \frac{\text{Turb. of incoming body} - \text{Turb. wire water}}{\text{Turb. of incoming body}} \times 100$$

where Turb.=turbidity

Turb. of incoming body=Turb. of fibre-filler mixture−Turb. of fibre

To do this, it is therefore necessary to measure, on the one hand, the turbidity of the fibre-filler mixture and, on the other hand, the turbidity of the fibre alone and the turbidity of the water of the fabric.

This latter is measured directly by reading the value of the turbidity indicated by the Nephelometer 155 from Defensor AG (Switzerland) in NTU (Nephelo Turbidity Unit) units.

On the other hand, to determine the turbidity of the fibre-filler mixture, a fibre-filler mixture is made from a masterbatch formed by diluting 4 parts of fibres consisting of 80% birch and 20% pine in 10 litres of water. 18.2 dry grams of the fibre masterbatch and 9.8 grams of the dry filler to be tested are added to a device known as a distributor (Rapid-Köthen) and topped up with 5 litres of water. After 15 minutes of stirring and the addition of the quantities indicated in table 1 below, of a retaining agent of the polyacrylamide type marketed under the name Praestol™ PK 422, by Stockhausen, Krefeld, Germany, a mixture that simulates the prevalent conditions for a sheet of paper of grammage equal to 80 g/m² and charged to 20% by weight is obtained.

The mixture thus formed is dried in a vacuum of 0.2 bar for over 2 seconds.

The values, at 700 rpm, of filler retentions in the filling, obtained by means of the above equation and as a function of the cationic retaining agent rate of the polyacrylamide type marketed under the name Praestol™ PK 422, by Stockhausen (Germany) are shown in table 1 below.

TABLE 1

| 0.01% PK 422 | 0.02% PK 422 | 0.03% PK 422 | 0.04% PK 422 | 0.05% PK 422 |
|---|---|---|---|---|
| 5% filler retention | 14% filler retention | 26% filler retention | 29% filler retention | 31% filler retention |

Test No. 24

This test illustrates the invention and implements 0.40% by dry weight, with respect to the dry weight of calcium carbonate, of the copolymer implemented in test No. 6 to obtain, from a calcium carbonate with a median diameter of 15 µm, and under the same operating conditions and using the same equipment as in test No. 1, an aqueous suspension of ground calcium carbonate having a dry matter concentration equal to 75.8% by weight and having a grain size such that 62% by weight of the particles have a diameter of less than 2 µm, and 32% by weight of the particles have a diameter of less than 1 µm measured on the Sedigraph™, corresponding to a median diameter equal to 1.57 µm.

The dry matter concentration (S.C.: Solid Content) and Brookfield™ viscosity results obtained with the same measuring method as test No. 1 are as follows:

S.C.=75.8%
Viscosity $(T_0)$=175 mPa.s
AVAG viscosity $(T_{7\ days})$=505 mPa.s
APAG viscosity $(T_{7\ days})$=195 mPa.s Once these Brookfield™ viscosity measurements have been made, the cationic demand of the calcium carbonate is determined using the same method as in test No. 1.

The filler retention in the filling is determined using the same procedure and the same equipment as those used in the previous test.

The values, at 700 rpm, of filler retentions in the filling, obtained by means of the above equation and as a function of the rate of cationic retaining agent of the polyacrylamide type marketed under the name Praestol™ PK 422, by Stockhausen (Germany) are shown in table 2 below.

TABLE 2

| 0.01% PK 422 | 0.02% PK 422 | 0.03% PK 422 | 0.04% PK 422 | 0.05% PK 422 |
|---|---|---|---|---|
| 15% filler retention | 26% filler retention | 38% filler retention | 47% filler retention | 54% filler retention |

Tables 1 and 2 point to a better filler retention for the test according to the invention.

EXAMPLE 3

This example illustrates, by means of a comparison with identical grain size, how to reduce the cationic polymer demand in the filling by implementing an aqueous suspension of calcium carbonate containing the copolymer used, according to the invention, as a grinding aid agent, for various grinding processes.

Test No. 25

This test illustrates the invention and implements, as dispersant before the grinding stage, 0.1% by dry weight, with respect to the dry weight of calcium carbonate, of a sodium and magnesium polyacrylate of an intrinsic viscosity equal to 7.8 ml/g according to the above-mentioned intrinsic viscosity method, and as a grinding aid agent during the grinding stage, 0.27% by dry weight, with respect to the dry weight of calcium carbonate, of the copolymer implemented in test No. 6 to obtain, from a calcium carbonate with a median diameter of 15 μm, with the same equipment as in test No. 1, a suspension of ground calcium carbonate having a dry matter concentration equal to 65.0% by weight and having a grain size such that 59% by weight of the particles have a diameter of less than 2 μm, and 34% by weight of the particles have a diameter of less than 1 μm measured on the Sedigraph 5100 corresponding to a median diameter equal to 1.58 μm.

The dry matter concentration (S.C.: Solid Content) and Brookfield™ viscosity results obtained with the same measuring method as test No. 1 are as follows:

S.C.=65.0%
Viscosity $(T_0)$=163 mPa.s
AVAG viscosity $(T_{7\ days})$=319 mPa.s
APAG viscosity $(T_{7\ days})$=185 mPa.s Once these Brookfield™ viscosity measurements have been made, the cationic demand of the calcium carbonate is determined using the same method as in test No. 1.

This gives a PDDPC cationic polymer demand equal to 1620μ Val/kg.

It can thus be seen that the cationic polymer demand is lower than that of the prior art for equivalent grain size.

Test No. 26

This test illustrates the invention and implements, as a grinding aid agent, 1.8% by dry weight with respect to the dry weight of calcium carbonate, of the copolymer implemented in test No. 6 to obtain, via a two-stage grinding process, a 74.7% by dry matter weight suspension of calcium carbonate with grain size such that 98% by weight of the particles have a diameter of less than 2 μm and 78% by weight of the particles have a diameter of less than 1 μm measured on the Sedigraph™ 5100.

This two-stage grinding process consists in grinding, during the first stage, a suspension of calcium carbonate of initial average diameter equal to 5 μm measured using the Sedigraph™ 5100 particle size analyzer in an aqueous suspension of calcium carbonate to a grain size such that 62% by weight of the particles have a diameter of less than 2 μm and 37% by weight of the particles have a diameter of less than 1 μm measured using the Sedigraph™ 5100, then in grinding this suspension until the desired end grain size is obtained.

The dry matter concentration (S.C.: Solid Content) and Brookfield™ viscosity results obtained with the same measuring method as test No. 1 are as follows:

S.C.=74.7%
Viscosity $(T_0)$=750 mPa.s
APAG viscosity $(T_{7\ days})$=680 mPa.s

Once these Brookfield™ viscosity measurements have been made, the specific surface area and the cationic demand of the calcium carbonate are determined using the same method as in test No. 1.

This gives a BET specific surface area of the pigment obtained, determined according to standard ISO 9277, equal to 7.5 m²/g and a PDDPC cationic polymer demand equal to 4140μ Val/kg.

EXAMPLE 4

This example illustrates, by means of a comparison with identical grain size, how to reduce the cationic polymer demand in the filling by implementing an aqueous suspension of various mineral matter containing the copolymer used, according to the invention, as a grinding aid agent.

Test No. 27

This test illustrates the invention and implements 0.40% by dry weight, with respect to the dry weight of aluminium trihydroxide, of the copolymer implemented in test No. 6 to obtain, from an aluminium trihydroxide with a median diameter equal to 50 μm, and under the same operating conditions and using the same equipment as in test No. 1, an aqueous suspension of ground aluminium trihydroxide having a dry matter concentration equal to 51.4% by weight and having a grain size such that 48.8% by weight of the particles have a diameter of less than 2 μm, and 29.4% by weight of the particles have a diameter of less than 1 μm measured on the Sedigraph™ 5100, corresponding to a median diameter equal to 2.00 μm.

The dry matter concentration (S.C.: Solid Content) and Brookfield™ viscosity results obtained with the same measuring method as test No. 1 are as follows:

S.C.=48.8%
Viscosity $(T_0)$=62 mPa.s
AVAG viscosity $(T_{7\ days})$=115 mPa.s
APAG viscosity $(T_{7\ days})$=95 mPa.s Once these Brookfield™ viscosity measurements have been made, the cationic demand is determined using the same method as in test No. 1.

This gives a PDDPC cationic polymer demand equal to 590μ Val/kg.

It can therefore be seen that the cationic polymer demand is low.

Test No. 28

This test illustrates the invention and implements 0.40% by weight, with respect to the dry weight of talc, of the copolymer implemented in test No. 6 to obtain, from a talc of median diameter equal to 15.7 μm or with a grain size such that 14% by weight of the particles have a diameter of less than 5 μm, 4% by weight of the particles have a diameter of less than 1 μm measured on the Sedigraph™ 5100 and under the same operating conditions and with the same equipment as in test No. 1, an aqueous suspension of ground talc having a dry matter concentration equal to 28.3% by weight and having a grain size such that 41% by weight of the particles have a diameter of less than 5 μm, and 12%-by weight of the particles have a diameter of less than 1 μm measured on the Sedigraph™ 5100 corresponding to a median diameter equal to 6.3 μm.

The dry matter concentration (S.C.: Solid Content) and Brookfield™ viscosity results obtained with the same measuring method as test No. 1 are as follows:

S.C.=28.3%
Viscosity $(T_0)$=219 mPa.s
AVAG viscosity $(T_{7\ days})$=415 mPa.s
APAG viscosity $(T_{7\ days})$=134 mPa.s Once these Brookfield™ viscosity measurements have been made, the cationic demand is determined using the same method as in test No. 1.

This gives a PDDPC cationic polymer demand equal to 520μ Val/kg.

It can therefore be seen that the cationic polymer demand is low.

Test No. 29

This test illustrates the invention and implements 0.40% by weight, with respect to the dry weight of kaolin, of the copolymer implemented in test No. 6 to obtain, from a kaolin of median diameter equal to 0.33 μm or with a grain size such that 92% by weight of the particles have a diameter of less than 0.5 μm, 4% by weight of the particles have a diameter of less than 0.2 μm measured on the Sedigraph™ 5100 and under the same operating conditions and with the same equipment as in test No. 1, an aqueous suspension of ground kaolin having a dry matter concentration equal to 15% by weight and having a grain size such that 95% by weight of the particles have a diameter of less than 0.5 μm, and 7% by weight of the particles have a diameter of less than 0.2 μm measured on the Sedigraph™ 5100 corresponding to a median diameter equal to 0.30 μm.

The dry matter concentration (S.C.: Solid Content) and Brookfield™ viscosity results obtained with the same measuring method as test No. 1 are as follows:

S.C.=15.0%
Viscosity $(T_0)$=244 mPa.s
AVAG viscosity $(T_{7\ days})$=212 mPa.s
APAG viscosity $(T_{7\ days})$=199 mPa.s Once these Brookfield™ viscosity measurements have been made, the cationic demand is determined using the same method as in test No. 1.

This gives a PDDPC cationic polymer demand equal to 420μ Val/kg.

It can therefore be seen that the cationic polymer demand is low.

EXAMPLE 5

This example illustrates, via measurement of the gloss and by comparison at identical grain size, the stability of the coating colour obtained by implementing an aqueous suspension of calcium carbonate according to the invention.

To do this in each of the tests of the example, it is necessary to prepare a coating colour with 68% concentration of dry matter, consisting of:
  80 parts by dry weight of the calcium carbonate aqueous suspension to be tested,
  5 parts by dry weight of a coarser calcium carbonate slurry,
  15 parts of delaminated kaolin
  9.5 parts of binder
  0.32 parts of carboxymethyl cellulose,
  0.6 parts of polyvinyl alcohol
  0.15 parts of optical brightener, and
  0.4 parts of calcium stearate Once the coating colour is prepared in this manner, its Brookfield™ viscosity is measured using a model DV-II+ Brookfield™ viscometer fitted with the corresponding spindle.

The coating colour prepared is then applied to a wood based paper 53 μm thick and with a grammage equal to 82, using a Combiblades pilot coater from Jagenberg GmbH fitted with a 0.457 mm thick blade.

A long dwell time application head is used with a blade angle of 45°. The coating speed is 1000 m/s and the average coating deposited is 11 g/m² on each surface of the paper.

The relative humidity obtained for each paper is of the order of 4.2% to 4.6% weight for weight.

The paper thus coated is then calendered using a supercalender with 9 contact zones between the two rollers, marketed by Kleinewefers.

The iron calendering diameter is 180 mm and 270 mm with respect to the cotton.

The measurement of the 75° TAPPI gloss (standard TAPPI T480 os-78) according to Lehmann of the coated and calendered paper, which consists in passing the coated and calendered paper sheet in the laboratory gloss meter (LGDL-05/2 from Lehmann Messtechnik AG, Switzerland) determines the supercalendering.

Once this gloss measurement is made, the paper samples are cut into DIN A3 format and are conditioned in an air conditioned room as per standard DIN EN 20187 to determine the 75° DIN gloss values according to standard DIN 54 502, and the 45° DIN gloss values according to standard DIN 54 502.

Test No. 30

This test illustrates the prior art and implements a suspension of calcium carbonate of the prior art.

To do this, in order to prepare the coating colour to be tested the composition of which is as described above, 22.5 kg of an aqueous suspension, of 78.2% dry matter concentration, of coarser calcium carbonate marketed by Omya under the name Hydrocarb™ 60, and 356.5 kg of an aqueous suspension, with 78.5% dry matter concentration, of finer calcium carbonate marketed by Omya under the name Setacarb™ are mixed in a receptacle containing 20 kg of water and 0.125 kg of a sodium polyacrylate with dry matter concentration equal to 42% and intrinsic viscosity equal to 6.2 ml/g as per the above-mentioned intrinsic viscosity method.

Once the calcium carbonates have been mixed, 52.5 kg of a delaminated kaolin marketed by Kaolin International B.V. under the name Amazon™ 88 are added while stirring at average speed.

Stirring is continued at average speed for 15 minutes and, following visual verification of whether or not agglomerates are present, stirring is continued until the few agglomerates disappear, or is stopped if there are no agglomerates.

7.5 kg of a 15% aqueous solution of carboxymethyl cellulose previously dissolved for at least 20 minutes at least 90° C. and marketed by Noviant under the name CMC Finnfix™ 10 are then added.

8.4 kg of a 25% aqueous solution of polyvinyl alcohol previously dissolved for at least 20 minutes at least 90° C. and marketed by Clariant under the name Mowiol™ 4-98 are then added.

28 kg of an 50% by dry weight aqueous dispersion of styrene-butadiene marketed by Dow Europe under the name Dow Latex DL 940 and 38.5 kg of a 50% by dry weight aqueous dispersion of an acrylic ester copolymer marketed by BASF under the name Acronal™ S 360 D are then added as binder.

Finally, 1.9 kg of optical brightener in the form of an aqueous derivative of 4,4-diaminostilbene-2,2-disulfonic acid marketed by Bayer under the name Blancophor™ P and 2.8 kg of a 50% concentration by dry weight aqueous dispersion of a calcium stearate sold by Henkel-Nopco AS under the name Nopcote™ C-104 are added.

Once these additions are made, stirring is maintained for another 15 minutes.

The pH of the coating colour is then checked and brought to a value of approximately 9 by means of a 10% soda solution.

The dry matter content of the coating colour is also checked and brought to a value of approximately 68.5% by adding water if necessary.

The Brookfield™ viscosity of the coating colour obtained as measured at 32° C. using the Brookfield™ DV-II+ model viscometer fitted with the corresponding spindle is equal to 6100 mPa.s at 20 min$^{-1}$ and 1800 mPa.s at 100 min$^{-1}$.

The various gloss measurements are made in accordance with the above-mentioned method and are shown in table 3 following the next test.

Test No. 31

This test illustrates the invention and implements the suspension of calcium carbonate of test No. 26 according to the invention.

To do this, in order to prepare the coating colour to be tested the composition of which is as described above, 22.5 kg of an aqueous suspension, of 78.2% dry matter concentration, of coarser calcium carbonate marketed by Omya under the name Hydrocarb™ 60, and 375 kg of the aqueous suspension of calcium carbonate of test No. 26 according to the invention, with 74.7% dry matter concentration are mixed in a receptacle containing 20 kg of water and 0.125 kg of a sodium polyacrylate with dry matter concentration equal to 42% and intrinsic viscosity equal to 6.2 ml/g as per the above-mentioned intrinsic viscosity method.

Once the calcium carbonates have been mixed, 52.5 kg of a delaminated kaolin marketed by Kaolin International B.V. under the name Amazon™ 88 are added while stirring at average speed.

Stirring is continued at average speed for 15 minutes and, following visual verification of whether or not agglomerates are present, stirring is continued until the few agglomerates disappear, or is stopped if there are no agglomerates.

7.5 kg of a 15% aqueous solution of carboxymethyl cellulose previously dissolved for at least 20 minutes at least 90° C. and marketed by Noviant under the name CMC Finnfix™ 10 are then added.

8.4 kg of a 25% aqueous solution of polyvinyl alcohol previously dissolved for at least 20 minutes at least 90° C. and marketed by Clariant under the name Mowiol™ 4-98 are then added.

28 kg of an 50% by dry weight aqueous dispersion of styrene-butadiene marketed by Dow Europe under the name Dow Latex DL 940 and 38.5 kg of a 50% by dry weight aqueous dispersion of an acrylic ester copolymer marketed by BASF under the name Acronal™ S 360 D are then added as binder.

Finally, 1.9 kg of optical brightener in the form of an aqueous derivative of 4,4-diaminostilbene-2,2-disulfonic acid marketed by Bayer under the name Blancophor™ P and 2.8 kg of a 50% concentration by dry weight aqueous dispersion of a calcium stearate sold by Henkel-Nopco AS under the name Nopcote™ C-104 are added.

Once these additions are made, stirring is maintained for another 15 minutes.

The pH of the coating colour is then checked and brought to a value of approximately 9 by means of a 10% soda solution.

The dry matter content of the coating colour is also checked and brought to a value of approximately 68.5% by adding water if necessary.

The Brookfield™ viscosity of the coating colour obtained as measured at 32° C. using the Brookfield™ DV-II+ model viscometer fitted with the corresponding spindle is equal to 3600 mPa.s at 20 min$^{-1}$ and 1200 mPa.s at 100 min$^{-1}$.

The various gloss measurements are made in accordance with the above-mentioned method and are shown in table 3 below.

TABLE 3

| | Standard | Unit | Prior art Test No. 32 | Invention Test No. 33 |
|---|---|---|---|---|
| coated paper | 1301 ISO 536 | g/m$^2$ | 102 | 105 |
| (75° TAPPI) OS gloss | TAPPI | % | 75 | 80 |
| (75° TAPPI) SS gloss | TAPPI | % | 77 | 82 |
| (75° DIN) OS gloss | DIN 54 502 | % | 46 | 50 |
| (75° DIN) SS gloss | DIN 54 502 | % | 48 | 54 |
| (45° DIN) OS gloss | DIN 54 502 | % | 17 | 23 |
| (45° DIN) SS gloss | DIN 54 502 | % | 19 | 28 |
| (PPS) 1.0 soft OS roughness | ISO 8791-4 | µm | 0.610 | 0.579 |
| (PPS) 1.0 soft SS roughness | ISO 8791-4 | µm | 0.608 | 0.530 |

OS = Upper surface (Oberseite)
SS = Fabric side or rear side (Siebseite)

The table shows that paper coated using coating colours containing aqueous suspensions of calcium carbonate according to the invention have a higher gloss irrespective of the viewing angle and a lower roughness than paper coated with standard coating colours of the prior art.

EXAMPLE 6

This example illustrates the use of the aqueous suspension according to the invention in a drying process.

Test No. 32

This test illustrates the prior art and implements 0.35% by dry weight, with respect to the dry weight of calcium carbonate, of a sodium and magnesium polyacrylate of intrinsic viscosity equal to 7.8 ml/g according to the above-mentioned intrinsic viscosity method, to obtain, from a calcium carbonate with a median diameter of 15 µm, an aqueous suspension of ground calcium carbonate having a dry matter concentration equal to 36.9% by weight and having a grain size such that 73% by weight of the particles have a diameter of less than 2 µm and 46% by weight of the particles have a diameter of less than 1 µm measured on the Sedigraph™ 5100 corresponding to a median diameter equal to 1.17 µm.

The aqueous suspension obtained is then dried using a dryer such as the Media Slurry Drier MSD 100 from Nara Machinery CO., LTD (Japan). The drying capacity obtained is then equal to 1220 g/h of dry product.

Test No. 33

This test illustrates the invention and implements 0.45% by dry weight, with respect to the dry weight of calcium carbonate, of the copolymer implemented in test No. 6 to obtain, from a calcium carbonate with a median diameter of 15 µm, an aqueous suspension of ground calcium carbonate having a dry matter concentration equal to 36.9% by weight and having a grain size such that 74% by weight of the particles have a diameter of less than 2 µm, and 44% by weight of the particles have a diameter of less than 1 µm measured on the Sedigraph™, corresponding to a median diameter equal to 1.18 µm.

The aqueous suspension obtained is then dried using a dryer such as the Media Slurry Drier MSD 100 from Nara Machinery CO., LTD (Japan). The drying capacity obtained is then equal to 1542 g/h of dry product, thus bringing about an increase of 21% in the drying capacity.

Test No. 34

This test illustrates the prior art and implements 0.45% by dry weight, with respect to the dry weight of calcium carbonate, of a sodium and magnesium polyacrylate of intrinsic viscosity equal to 7.8 ml/g according to the above-mentioned intrinsic viscosity method, to obtain, from a calcium carbonate with a median diameter of 0.72 μm, an aqueous suspension of ground calcium carbonate having a dry matter concentration equal to 33.3% by weight and having a grain size such that 98% by weight of the particles have a diameter of less than 2 μm and 84% by weight of the particles have a diameter of less than 1 μm measured on the Sedigraph™ 5100 corresponding to a median diameter equal to 0.60 μm.

The aqueous suspension obtained is then dried using a dryer such as the Media Slurry Drier MSD 100 from Nara Machinery CO., LTD (Japan). The drying capacity obtained is then equal to 1,018 g/h of dry product.

Test No. 35

This test illustrates the invention and implements 0.45% by dry weight, with respect to the dry weight of calcium carbonate, of the copolymer implemented in test No. 6 to obtain, from a calcium carbonate with a median diameter of 0.72 μm, an aqueous suspension of ground calcium carbonate having a dry matter concentration equal to 33.3% by weight and having a grain size such that 98% by weight of the particles have a diameter of less than 2 μm, and 81% by weight of the particles have a diameter of less than 1 μm measured on the Sedigraph™, corresponding to a median diameter equal to 0.67 μm.

The aqueous suspension obtained is then dried using a dryer such as the Media Slurry Drier MSD 100 from Nara Machinery CO., LTD (Japan). The drying capacity obtained is then equal to 1,093 g/h of dry product, thus bringing about an increase of 7% in the drying capacity.

EXAMPLE 7

This example illustrates the use of the dried slurry of calcium carbonate according to the invention in the field of plastics and more particularly in a PVC application, by comparing the dispersion, in a rigid PVC formulation, of a dried slurry of natural calcium carbonate according to the invention and according to the prior art by comparison of the Theological behaviour obtained.

To do this, for each of the tests of the example, the mixture corresponding to the following formulation, in parts, is prepared, with the exception of test No. 36 which does not contain calcium carbonate:

| | |
|---|---|
| PVC EVAPOLSH 6521 marketed by EVC (Germany) | 100 |
| tribasic lead sulphate | 1.5 |
| dibasic lead stearate | 1.3 |
| calcium stearate | 0.6 |
| Wax E | 0.05 |
| Calcium carbonate to be tested | 30.0 |

This mixture is prepared in a Papenmeier mixer at 100° C. for 10 minutes. The mixtures are then gelated on a rotating cylinder at 20 rpm at 170° C. in a mixing chamber of the MP Göttfert extrusion meter Version 2.3.0.

The rheological behaviour is then evaluated by measuring the gelation time of the mixture.

Test No. 36—Control without Filler

This test is a control test which relates to the above-mentioned formulation but without calcium carbonate.

The gelation time obtained is equal to 738 seconds.

Test No. 37

This test illustrates the prior art and implements the dried product of test No. 32.

The gelation time obtained is equal to 720 seconds for a formulation with 30 parts of filler, i.e. an increase of 2.5% with respect to the filler-free control.

Test No. 38

This test illustrates the invention and implements the dried product of test No. 33.

The gelation time obtained is equal to 562 seconds for a formulation with 30 parts of filler, i.e. an increase of 23.8% with respect to the filler-free control.

These results show that a dry product of the invention can be favourably used in the field of plastics, and more particularly in rigid PVC formulations.

The invention claimed is:

1. An aqueous suspension of refined mineral matter comprising refined mineral matter and a grinding aid agent, wherein the grinding agent comprises a copolymer of:
   a) at least one ethylenically unsaturated anionic monomer having (i) a monocarboxyl function selected from ethylenically unsaturated monomers having a monocarboxyl function, or (ii) a dicarboxyl function selected from ethylenically unsaturated monomers having a dicarboxyl function or (iii) a sulfonic function selected from ethylenically unsaturated monomers having a sulfonic function, or (iv) a phosphoric function selected from ethylenically unsaturated monomers having a phosphoric function, or (v) a phosphonic function selected from ethylenically unsaturated monomers having a phosphonic function or mixtures thereof,
   b) at least one non-ionic ethylenically unsaturated monomer of formula (I):

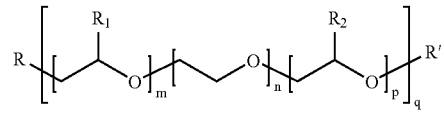

where
   m and p represent a number of alkylene oxide units less than or equal to 150
   n represents a number of ethylene oxide units less than or equal to 150
   q represents an integer equal to at least 1 and such that $5 \leq (m+n+p)q \leq 150$,
   $R_1$ represents hydrogen or the methyl or ethyl radical
   $R_2$ represents hydrogen or the methyl or ethyl radical
   R represents a radical containing a polymerizable unsaturated function, belonging to the vinyl group and to the group of acrylic, methacrylic, maleic, itaconic, crotonic, and vinylphtalic esters and to the group of urethane unsaturates such as acrylurethane, methacrylurethane, α-α' dimethyl-isopropenyl-benzylurethane and allylurethane, and to the group of allyl or vinyl ethers, whether or not substituted, or to the group of ethylenically unsaturated amides or imides,
   R' represents hydrogen or a hydrocarbon radical having from 1 to 40 carbon atoms,
   or a mixture of several monomers of formula (I), c) at least one organofluorinated or organosilylated monomer selected from among the molecules of formulae (IIa) or (IIb) or (IIc) or mixtures thereof:

with formula (IIa)

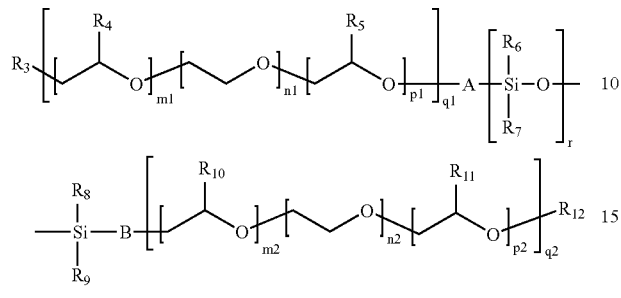

where m1, p1, m2 and p2 represent a number of alkylene oxide units less than or equal to 150 n1 and n2 represent a number of ethylene oxide units less than or equal to 150 q1 and q2 represent an integer equal to at least 1 and such that $0 \leq (m1+n1+p1)q1 \leq 150$ and $0 \leq (m2+n2+p2)q2 \leq 150$, r represents a number such that $1 \leq r \leq 200$ $R_3$ represents a radical containing a polymerizable unsaturated function, belonging to the vinyl group and to the group of acrylic, methacrylic, maleic, itaconic, crotonic, and vinylphtalic esters and to the group of urethane unsaturates such as acrylurethane, methacrylurethane, $\alpha$-$\alpha'$ dimethyl-isopropenyl-benzylurethane and allylurethane, and to the group of allyl or vinyl ethers, whether or not substituted, or to the group of ethylenically unsaturated amides or imides, $R_4$, $R_5$, $R_{10}$ and $R_{11}$ represent hydrogen or the methyl or ethyl radical $R_6$, $R_7$, $R_8$ and $R_9$ represent straight or branched alkyl, aryl, alkylaryl or arylalkyl groups having from 1 to 20 carbon atoms, or a mixture thereof $R_{12}$ represents a hydrocarbon radical having from 1 to 40 carbon atoms A and B are groups which may be present, in which case they represent a hydrocarbon radical having from 1 to 4 carbon atoms, with formula (IIb)

R—A—Si(OB)$_3$ where

R represents a radical containing a polymerizable unsaturated function, belonging to the vinyl group and to the group of acrylic, methacrylic, maleic, itaconic, crotonic, and vinylphtalic esters and to the group of urethane unsaturates such as acrylurethane, methacrylurethane, $\alpha$-$\alpha'$ dimethyl-isopropenyl-benzylurethane and allylurethane, and to the group of allyl or vinyl ethers, whether or not substituted, or to the group of ethylenically unsaturated amides or imides, A is a group which may be present, in which case it represents a hydrocarbon radical having from 1 to 4 carbon atoms, B represents a hydrocarbon radical having from 1 to 4 carbon atoms, with formula (IIc)

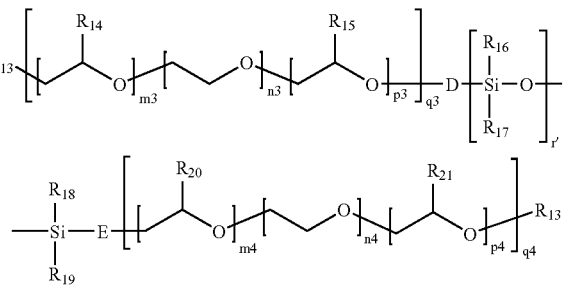

where m3, p3, m4 and p4 represent a number of alkylene oxide units less than or equal to 150 n3 and n4 represent a number of ethylene oxide units less than or equal to 150 q3 and q4 represent an integer equal to at least 1 and such that $0 \leq (m3+n3+p3)q3 \leq 150$ and $0 \leq (m4+n4+p4)q4 \leq 150$, r' represents a number such that $1 \leq r' \leq 200$, $R_{13}$ represents a radical containing a polymerizable unsaturated function, belonging to the vinyl group and to the group of acrylic, methacrylic, maleic, itaconic, crotonic, and vinylphtalic esters and to the group of urethane unsaturates such as acrylurethane, methacrylurethane, $\alpha$-$\alpha'$ dimethyl-isopropenyl-benzylurethane and allylurethane, and to the group of allyl or vinyl ethers, whether or not substituted, or to the group of ethylenically unsaturated amides or imides, $R_{14}$, $R_{15}$, $R_{20}$ and $R_{21}$ represent hydrogen or the methyl or ethyl radical $R_{16}$, $R_{17}$, $R_{18}$ and $R_{19}$ represent straight or branched alkyl, aryl, alkylaryl or arylalkyl groups having from 1 to 20 carbon atoms, or a mixture thereof D and E are groups which may be present, in which case they represent a hydrocarbon radical having from 1 to 4 carbon atoms, d) optionally at least one monomer of the acrylamide or methacrylamide type or their derivatives or mixtures thereof, or at least one non water-soluble monomer, or at least one cationic monomer or quaternary ammonium, e) optionally at least one crosslinking monomer selected from the group consisting of ethylene glycol dimethacrylate, trimethylolpropanetriacrylate, allyl acrylate, the allyl maleates, methylene-bis-acrylamide, methylene-bis-methacrylamide, tetrallyloxyethane, triallylcyanurates, and allyl ethers prepared from polyols, the total of the components a), b), c), d) and e) being equal to 100%, and having an intrinsic viscosity less than or equal to 100 ml/g determined in accordance with the method known as the intrinsic viscosity method.

2. The aqueous suspension of mineral substances refined according to claim 1 characterized in that said copolymer comprises, by weight, of:

a) from 2% to 95% of at least one ethylenically unsaturated anionic monomer, b) from 97.9% to 4.9% of at least one non-ionic ethylenically unsaturated monomer of formula (I), c) from 0.1% to 50% of at least one organofluorinated or organosilylated monomer selected from among the molecules of formulae (IIa) or (IIb) or (IIc) or mixtures thereof, d) from 0% to 50% of at least one monomer of the acrylamide or methacrylamide type, or at least one non water-soluble monomer, or unsaturated esters, or vinyls, or at least one cationic monomer or quaternary ammonium, e) from 0% to 5% of at least one crosslinking monomer selected from the group consisting of ethylene glycol dimethacrylate, trimethyloipropanetriacrylate, allyl acrylate, the allyl maleates, methylene-bis-acrylamide, methylene-bis-methacrylamide, tetrallyloxyethane, triallylcyanurates, allyl ethers prepared from polyols, the total of the components a), b), c), d) and e) being equal to 100%, and in that said copolymer has an intrinsic viscosity less than or equal to 100 m/g determined in accordance with the method known as the intrinsic viscosity method.

3. The aqueous suspension of mineral matter according to claim 1, characterized in that said copolymer is in its acid form, fully neutralized or partially neutralized by one or more neutralizing agents having a monovalent neutralizing function or a polyvalent neutralizing function.

4. The aqueous suspension of mineral matter according to claim 1, characterized in that it contains from 0.05% to 10% of said copolymer by dry weight with respect to the dry weight of mineral matter.

5. The aqueous suspension of mineral matter according to claim 1, characterized in that it contains from 0.05% to 10% of said copolymer by dry weight with respect to the dry weight of mineral matter and at least one other dispersant or grinding aid agent.

6. The aqueous suspension of mineral matter according to claim 5, characterized in that the other dispersant or grinding aid agent is selected from homopolymers or copolymers of acrylic acid in their acid form, or fully or partially neutralized by one or more neutralizing agents having a monovalent neutralizing function or a polyvalent neutralizing function, or of cations of higher valency, or $H_3O^+$ ion donors.

7. The aqueous suspension of mineral matter according to claim 5, characterized in that it contains from 0.05% to 1.0% by dry weight with respect to the dry weight of mineral matter of said other dispersant or grinding aid agent.

8. The aqueous suspension of mineral matter according to claim 1, characterized in that the mineral matter is selected from calcium carbonate, dolomite, gypsum, calcium hydroxide, satin white, titanium dioxide, aluminium trihydroxide, mica, talc, kaolins, calcine kaolins, or mixed carbonate based fillers of metals, and mixtures of said fillers, or mixtures with synthetic or natural fibres or co-structures of minerals.

9. The aqueous suspension of mineral matter according to claim 1, characterized in that the suspension has a dry matter concentration of between 15% and 85% by weight.

10. The aqueous suspension of mineral matter according to claim 1, characterized in that the mineral matter presents a median grain diameter, as measured using the Sedigraph™ 5100, of between 50 μm and 0.01 μm.

11. The aqueous suspension of mineral matter according to claim 1, characterized in that the mineral matter grains have, for equivalent grain size, a BET specific surface area determined according to standard ISO 9277 less than that of the mineral matter grains of the aqueous suspensions of mineral matter refined using polyacrylates, homopolymers or copolymers.

12. The aqueous suspension of mineral matter according to claim 1, characterized in that the pH of the final suspension is between 7.5 and 13.

13. Paper, paint or plastic comprising a pigment prepared from the aqueous suspension of mineral matter according to claim 1.

14. Paper comprising a pigment prepared from the aqueous suspension of mineral matter according to claim 1, wherein the pigment is included in the coating or surface treatment of the paper.

15. Paper, board, or analogous sheets comprising a pigment prepared from the aqueous suspension of mineral matter according to claim 1, wherein the pigment is included as a filler in the paper, board or analogous sheets.

16. Paper or board sheets comprising a pigment prepared from the aqueous suspension of mineral matter according to claim 1.

17. Plastics comprising a pigment prepared from the aqueous suspension of mineral matter according to claim 1.

18. The aqueous suspension of mineral matter according to claim 1, wherein the ethylenically unsaturated anionic monomer of (a) comprises acrylic or methacrylic acid, hemiesters of diacids, $C_1$ to $C_4$ monoesters of maleic or itaconic acid, or mixtures thereof; crotonic, isocrotonic, cinnamic, itaconic, maleic acid, anhydrides of carboxyl acids, maleic anhydride; acrylamido-methyl-propane-sulfonic acid, sodium methallylsulfonate, vinylsulfonic acid and styrenesulfonic acid; vinyiphosphoric acid, ethylene glycol methacrylate phosphate, propylene glycol methacrylate phosphate, ethylene glycol acrylate phosphate, propylene glycol acrylate phosphate and their ethoxylates, or vinylphosphonic acid.

19. The aqueous suspension of mineral matter according to claim 1, wherein the ethylenically unsaturated anionic monomer of (a) comprises acrylic acid and methacrylic acid.

20. The aqueous suspension of mineral matter according to claim 1, wherein q in formula (I) represents an integer such that $15 \leq (m+n+p)q \leq 120$.

21. The aqueous suspension of mineral matter according to claim 1, wherein R' in formula (I) represents a hydrocarbon radical having from 1 to 12 carbon atoms.

22. The aqueous suspension of mineral matter according to claim 1, wherein R' in formula (I) represents a hydrocarbon radical having from 1 to 4 carbon atoms.

23. The aqueous suspension of mineral matter according to claim 1, wherein in formula (I), $R_1$ and $R_2$ are hydrogen, R is methacrylate, and R' is methyl.

24. The aqueous suspension of mineral matter according to claim 1, wherein in formula (I), $R_1$ and $R_2$ are hydrogen, R is vinyl, and R' is methyl.

25. The aqueous suspension of mineral matter according to claim 1, wherein component c) is formula (IIb).

26. The aqueous suspension of mineral matter according to claim 25, wherein in formula (IIb), R is vinyl, A is absent and B is methyl.

27. The aqueous suspension of mineral matter according to claim 25, wherein in formula (IIb), R is methacrylate, A is propyl and B is methyl.

28. The aqueous suspension of mineral matter according to claim 1, wherein d) is optionally a monomer comprising N-[3-(dimethylamino)propyl]acrylamide or N-[3-(dimethylamino)propyl]methacrylamide, and mixtures thereof; alkyl acrylates or methacrylates or mixtures thereof; N-[2-(dimethylamino)ethyl]methacrylate, N-[2-(dimethylamino)ethyl]acrylate, or mixtures thereof; vinyl acetate, vinylpyrrolidone, styrene, alphamethylstyrene, or mixtures thereof; [2-(methacryloyloxy)ethyl]trimethyl ammonium chloride, sulphate, [2-(acryloyloxy)ethyl]trimethyl ammonium chloride, sulphate, [3-(acrylamido)propyl]trimethyl ammonium chloride, sulphate, dimethyl diallyl ammonium chloride, sulphate, [3-(methacrylamido)propyl]trimethyl ammonium chloride or sulphate, or mixtures thereof.

29. The aqueous suspension of mineral matter according to claim 1, wherein e) is optionally a crosslinking monomer comprising an allyl ether prepared from pentacrylthritol, sorbitol or sucrose.

30. The aqueous suspension of mineral matter according to claim 1, wherein the copolymer comprises from 3% to 25% of component a).

31. The aqueous suspension of mineral matter according to claim 1, wherein the copolymer comprises from 4% to 15% of component a).

32. The aqueous suspension of mineral matter according to claim 1, wherein the copolymer comprises from 95% to 65% of component b).

33. The aqueous suspension of mineral matter according to claim 1, wherein the copolymer comprises from 92% to 78% of component b).

34. The aqueous suspension of mineral matter according to claim 1, wherein the copolymer comprises from 0.2% to 10% of component (c).

35. The aqueous suspension of mineral matter according to claim 1, wherein the copolymer comprises from 0.3% to 5% of component c).

36. The aqueous suspension of mineral matter according to claim 1, wherein the copolymer comprises from 0% to 10% of component d).

37. The aqueous suspension of mineral matter according to claim 1, wherein the copolymer comprises from 0% to 5% of component d).

38. The aqueous suspension of mineral matter according to claim 1, wherein the copolymer comprises from 0 to 3% of component e).

39. The aqueous suspension of mineral matter according to claim 1, characterized in that said copolymer is in its acid form, fully neutralized or partially neutralized by one or more neutralizing agents comprising sodium, potassium, lithium, ammonium alkaline cations; primary, secondary or tertiary aliphatic and/or cyclic amines, stearylamine, ethanolamines; mono-, di- or triethanolamine; mono and diethylamine; cyclohexylamine, methylcyclohexylamine, aminomethylpropanol, morpholine; magnesium, calcium, or zinc alkaline earth divalent cations; and aluminium trivalent cations.

40. The aqueous suspension of mineral matter according to claim 5, characterized in that the other dispersant or grinding aid agent is selected from sodium, potassium, lithium or ammonium alkaline cations; primary, secondary or tertiary aliphatic and/or cyclic amines, stearylamine, ethanolamines (mono-, di-, triethanolamine); mono and diethylamine; cyclohexylamine, methylcyclohexylamine, aminomethyipropanol, morpholine; magnesium, calcium, or zinc alkaline earth divalent cations; aluminium trivalent cations; and $H_3O^+$ ion donors, phosphoric acid and/or its salts with mono and/or divalent bases.

41. The aqueous suspension of mineral matter according to claim 40, wherein the other dispersant or grinding aid agent is phosphoric acid and/or its salts with soda and/or lime.

42. The aqueous suspension of mineral matter according to claim 1, characterized in that the mineral matter is calcium carbonate.

43. The aqueous suspension of mineral matter according to claim 1, characterized in that the mineral matter is calcium carbonate selected from marble, calcite, chalk or mixtures thereof.

44. The aqueous suspension of mineral matter according to claim 1, characterized in that the mineral matter is calcium associated with magnesium, talc-calcium carbonate or calcium carbonate-kaolin mixtures, mixtures of calcium carbonate with aluminium nihydroxide, talc-calcium carbonate or talc-titanium dioxide co-structures.

45. The aqueous suspension of mineral matter according to claim 1, characterized in that the suspension has a dry matter concentration of between 40% and 80%.

46. The aqueous suspension of mineral matter according to claim 1, characterized in that the suspension has a dry matter concentration of between 50% and 78%.

47. The aqueous suspension of mineral matter according to claim 1, characterized in that the mineral matter presents a median grain diameter, as measured using the Sedigraph™ 5100, of between 5 μm and 0.2 μm.

48. The aqueous suspension of mineral matter according to claim 1, characterized in that the mineral matter presents a median grain diameter, as measured using the Sedigraph™ 5100, of between 2 μm and 0.3 μm.

49. The aqueous suspension of mineral matter according to claim 1, characterized in that the pH of the final suspension is between 8 and 12.

50. The aqueous suspension of mineral matter according to claim 1, characterized in that the pH of the final suspension is between 8.5 and 10.

* * * * *